United States Patent
Danielyan

(12) 
(10) Patent No.: US 9,626,358 B2
(45) Date of Patent: Apr. 18, 2017

(54) CREATING ONTOLOGIES BY ANALYZING NATURAL LANGUAGE TEXTS

(71) Applicant: ABBYY InfoPoisk LLC, Moscow (RU)

(72) Inventor: Tatiana Danielyan, Moscow (RU)

(73) Assignee: ABBYY InfoPoisk LLC (RU)

( * ) Notice: Subject to any disclaimer, the term of this patent is extended or adjusted under 35 U.S.C. 154(b) by 122 days.

(21) Appl. No.: 14/588,644

(22) Filed: Jan. 2, 2015

(65) Prior Publication Data

US 2016/0147736 A1    May 26, 2016

Related U.S. Application Data

(63) Continuation-in-part of application No. 14/559,078, filed on Dec. 3, 2014.

(30) Foreign Application Priority Data

Nov. 26, 2014  (RU) ................. 2014147623

(51) Int. Cl.
   *G06F 17/27*    (2006.01)
   *G06K 9/00*     (2006.01)

(52) U.S. Cl.
   CPC ..... *G06F 17/2785* (2013.01); *G06K 9/00463* (2013.01); *G06K 9/00483* (2013.01); *G06K 2209/01* (2013.01)

(58) Field of Classification Search
   CPC .......... G06F 17/30734; G06F 17/2785; G06F 17/271; G06F 17/30731; G06F 9/00463;
   (Continued)

(56) References Cited

U.S. PATENT DOCUMENTS 4,706,212 A    11/1987  Toma
5,068,789 A    11/1991  Van Vliembergen
(Continued)

FOREIGN PATENT DOCUMENTS

EP     2400400 A1    12/2001
EP     1365329 B1    10/2009
WO     2011160204 A1 12/2011

OTHER PUBLICATIONS

Bolshakov, "Co-Ordinative Ellipsis in Russian Texts: Problems of Description and Restoration". Published in: Proceeding COLING '88 Proceedings of the 12th conference on Computational linguistics—vol. 1 doi>10.3115/991635.991649, 1988, 65-67.
(Continued)

*Primary Examiner* — Thierry L Pham
(74) *Attorney, Agent, or Firm* — Veronica Weinstein

(57) ABSTRACT

Systems and methods for creating ontologies by analyzing natural language texts. An example method comprises: receiving a plurality of semantic structures associated with a text corpus; identifying a first semantic structure and a second semantic structure, wherein the first semantic structure comprises a first substructure and a second substructure, wherein the second semantic structure comprises a third substructure and a fourth substructure, and wherein the first substructure is similar to the third substructure in view of a first similarity criterion; and responsive to determining that the second substructure is similar to the fourth substructure in view of a second similarity criterion, associating, with a certain concept of an ontology associated with the text corpus, objects represented by the second substructure and the fourth substructure.

20 Claims, 18 Drawing Sheets

(58) Field of Classification Search
CPC ............ G06F 9/00483; G06K 9/00463; G06K 2209/01
USPC .................................................. 704/8, 9, 257
See application file for complete search history.

(56) References Cited

U.S. PATENT DOCUMENTS

| | | | |
|---|---|---|---|
| 5,128,865 A | 7/1992 | Sadler | |
| 5,146,405 A | 9/1992 | Church | |
| 5,175,684 A | 12/1992 | Chong | |
| 5,268,839 A | 12/1993 | Kaji | |
| 5,301,109 A | 4/1994 | Landauer et al. | |
| 5,386,556 A | 1/1995 | Courts et al. | |
| 5,418,717 A | 5/1995 | Su et al. | |
| 5,426,583 A | 6/1995 | Uribe-Echebarria Diaz De Mendibil | |
| 5,475,587 A | 12/1995 | Anick et al. | |
| 5,477,451 A | 12/1995 | Brown et al. | |
| 5,490,061 A | 2/1996 | Tolin et al. | |
| 5,497,319 A | 3/1996 | Chong et al. | |
| 5,510,981 A | 4/1996 | Berger et al. | |
| 5,550,934 A | 8/1996 | Van Vliembergen et al. | |
| 5,559,693 A | 9/1996 | Anick et al. | |
| 5,669,007 A | 9/1997 | Tateishi | |
| 5,677,835 A | 10/1997 | Carbonell et al. | |
| 5,678,051 A | 10/1997 | Aoyama | |
| 5,687,383 A | 11/1997 | Nakayama et al. | |
| 5,696,980 A | 12/1997 | Brew | |
| 5,715,468 A | 2/1998 | Budzinski | |
| 5,721,938 A | 2/1998 | Stuckey | |
| 5,724,593 A | 3/1998 | Hargrave et al. | |
| 5,729,741 A | 3/1998 | Liaguno et al. | |
| 5,737,617 A | 4/1998 | Bernth et al. | |
| 5,752,051 A | 5/1998 | Cohen | |
| 5,768,603 A | 6/1998 | Brown et al. | |
| 5,784,489 A | 7/1998 | Van Vliembergen et al. | |
| 5,787,410 A | 7/1998 | McMahon | |
| 5,794,050 A | 8/1998 | Dahlgren et al. | |
| 5,794,177 A | 8/1998 | Carus et al. | |
| 5,826,219 A | 10/1998 | Kutsumi | |
| 5,826,220 A | 10/1998 | Takeda et al. | |
| 5,848,385 A | 12/1998 | Poznanski et al. | |
| 5,867,811 A | 2/1999 | O'Donoghue | |
| 5,873,056 A | 2/1999 | Liddy et al. | |
| 5,884,247 A | 3/1999 | Christy | |
| 5,995,920 A | 11/1999 | Carbonell et al. | |
| 6,006,221 A | 12/1999 | Liddy et al. | |
| 6,055,528 A | 4/2000 | Evans | |
| 6,076,051 A | 6/2000 | Messerly et al. | |
| 6,081,774 A | 6/2000 | De Hita et al. | |
| 6,161,083 A | 12/2000 | Franz et al. | |
| 6,182,028 B1 | 1/2001 | Karaali et al. | |
| 6,223,150 B1 | 4/2001 | Duan et al. | |
| 6,233,544 B1 | 5/2001 | Alshawi | |
| 6,233,546 B1 | 5/2001 | Datig | |
| 6,243,669 B1 | 6/2001 | Horiguchi | |
| 6,243,670 B1 | 6/2001 | Bessho et al. | |
| 6,243,689 B1 | 6/2001 | Norton | |
| 6,243,723 B1 | 6/2001 | Ikeda et al. | |
| 6,246,977 B1 | 6/2001 | Messerly et al. | |
| 6,260,008 B1 | 7/2001 | Sanfilippo | |
| 6,266,642 B1 | 7/2001 | Franz et al. | |
| 6,275,789 B1 | 8/2001 | Moser et al. | |
| 6,278,967 B1 | 8/2001 | Akers et al. | |
| 6,282,507 B1 | 8/2001 | Horiguchi et al. | |
| 6,285,978 B1 | 9/2001 | Bernth et al. | |
| 6,330,530 B1 | 12/2001 | Horiguchi et al. | |
| 6,345,245 B1 | 2/2002 | Sugiyama et al. | |
| 6,349,276 B1 | 2/2002 | McCarley | |
| 6,356,864 B1 | 3/2002 | Foltz et al. | |
| 6,356,865 B1 | 3/2002 | Franz et al. | |
| 6,381,598 B1 | 4/2002 | Williamowski et al. | |
| 6,393,389 B1 | 5/2002 | Chanod et al. | |
| 6,442,524 B1 | 8/2002 | Ecker et al. | |
| 6,463,404 B1 | 10/2002 | Appleby | |
| 6,470,306 B1 | 10/2002 | Pringle et al. | |
| 6,523,026 B1 | 2/2003 | Gillis et al. | |
| 6,529,865 B1 | 3/2003 | Duan et al. | |
| 6,601,026 B2 | 7/2003 | Appelt et al. | |
| 6,604,101 B1 | 8/2003 | Chan et al. | |
| 6,622,123 B1 | 9/2003 | Chanod et al. | |
| 6,658,627 B1 | 12/2003 | Gallup et al. | |
| 6,721,697 B1 | 4/2004 | Duan et al. | |
| 6,760,695 B1 | 7/2004 | Kuno et al. | |
| 6,778,949 B2 | 8/2004 | Duan et al. | |
| 6,871,174 B1 | 3/2005 | Dolan et al. | |
| 6,871,199 B1 | 3/2005 | Binnig et al. | |
| 6,901,399 B1 | 5/2005 | Corston et al. | |
| 6,901,402 B1 | 5/2005 | Corston-Oliver et al. | |
| 6,928,407 B2 | 8/2005 | Ponceleon et al. | |
| 6,928,448 B1 | 8/2005 | Franz et al. | |
| 6,937,974 B1 | 8/2005 | D'Agostini | |
| 6,947,923 B2 | 9/2005 | Cha et al. | |
| 6,965,857 B1 | 11/2005 | Decary | |
| 6,983,240 B2 | 1/2006 | Ait-Mokhtar et al. | |
| 6,986,104 B2 | 1/2006 | Green et al. | |
| 7,013,264 B2 | 3/2006 | Dolan et al. | |
| 7,020,601 B1 | 3/2006 | Hummel et al. | |
| 7,027,974 B1 | 4/2006 | Busch et al. | |
| 7,050,964 B2 | 5/2006 | Menzes et al. | |
| 7,085,708 B2 | 8/2006 | Manson et al. | |
| 7,132,445 B2 | 11/2006 | Taveras et al. | |
| 7,146,358 B1 | 12/2006 | Gravano et al. | |
| 7,167,824 B2 | 1/2007 | Kallulli | |
| 7,191,115 B2 | 3/2007 | Moore | |
| 7,200,550 B2 | 4/2007 | Menezes et al. | |
| 7,263,488 B2 | 8/2007 | Chu et al. | |
| 7,269,594 B2 | 9/2007 | Corston-Oliver et al. | |
| 7,346,493 B2 | 3/2008 | Ringger et al. | |
| 7,356,457 B2 | 4/2008 | Pinkham et al. | |
| 7,409,404 B2 | 8/2008 | Gates | |
| 7,461,056 B2 | 12/2008 | Cao et al. | |
| 7,466,334 B1 | 12/2008 | Baba | |
| 7,475,015 B2 | 1/2009 | Epstein et al. | |
| 7,577,683 B2 | 8/2009 | Cho et al. | |
| 7,619,656 B2 | 11/2009 | Ben-Ezra et al. | |
| 7,668,791 B2 | 2/2010 | Azzam et al. | |
| 7,672,830 B2 | 3/2010 | Goutte et al. | |
| 7,672,831 B2 | 3/2010 | Todhunter et al. | |
| 7,739,102 B2 | 6/2010 | Bender | |
| 7,769,579 B2 | 8/2010 | Zhao et al. | |
| 8,065,290 B2 | 11/2011 | Hogue et al. | |
| 8,073,865 B2 | 12/2011 | Davis et al. | |
| 8,078,450 B2 | 12/2011 | Anisimovich et al. | |
| 8,145,473 B2 | 3/2012 | Anisimovich et al. | |
| 8,176,048 B2 | 5/2012 | Morgan et al. | |
| 8,214,199 B2 | 7/2012 | Anismovich et al. | |
| 8,229,730 B2 | 7/2012 | Van Den Berg et al. | |
| 8,229,944 B2 | 7/2012 | Latzina et al. | |
| 8,260,049 B2 | 9/2012 | Deryagin et al. | |
| 8,266,077 B2 | 9/2012 | Handley | |
| 8,271,453 B1 | 9/2012 | Pasca et al. | |
| 8,285,728 B1 | 10/2012 | Rubin | |
| 8,300,949 B2 | 10/2012 | Xu | |
| 8,301,633 B2 | 10/2012 | Cheslow | |
| 8,370,128 B2 | 2/2013 | Brun et al. | |
| 8,402,036 B2 | 3/2013 | Blair-Goldensohn et al. | |
| 8,423,495 B1 | 4/2013 | Komissarchik et al. | |
| 8,468,153 B2 | 6/2013 | Ahlberg et al. | |
| 8,495,042 B2 | 7/2013 | Symington et al. | |
| 8,533,188 B2 | 9/2013 | Yan et al. | |
| 8,548,951 B2 | 10/2013 | Solmer et al. | |
| 8,554,558 B2 | 10/2013 | McCarley et al. | |
| 8,577,907 B1 | 11/2013 | Singhal et al. | |
| 8,856,096 B2 | 10/2014 | Marchisio et al. | |
| 2001/0014902 A1 | 8/2001 | Hu et al. | |
| 2001/0029442 A1 | 10/2001 | Shiotsu et al. | |
| 2001/0029455 A1 | 10/2001 | Chin et al. | |
| 2002/0040292 A1 | 4/2002 | Marcu | |
| 2003/0145285 A1 | 7/2003 | Miyahira et al. | |
| 2003/0158723 A1 | 8/2003 | Masuichi et al. | |
| 2003/0176999 A1 | 9/2003 | Calcagno et al. | |
| 2003/0182102 A1 | 9/2003 | Corston-Oliver et al. | |
| 2003/0204392 A1 | 10/2003 | Finnigan et al. | |

(56) References Cited

U.S. PATENT DOCUMENTS

| | | |
|---|---|---|
| 2004/0034520 A1 | 2/2004 | Langkilde-Geary et al. |
| 2004/0064438 A1 | 4/2004 | Kostoff |
| 2004/0098247 A1 | 5/2004 | Moore |
| 2004/0122656 A1 | 6/2004 | Abir |
| 2004/0172235 A1 | 9/2004 | Pinkham et al. |
| 2004/0193401 A1 | 9/2004 | Ringger et al. |
| 2004/0254781 A1 | 12/2004 | Appleby |
| 2004/0261016 A1 | 12/2004 | Glass et al. |
| 2005/0010421 A1 | 1/2005 | Watanabe et al. |
| 2005/0015240 A1 | 1/2005 | Appleby |
| 2005/0080613 A1 | 4/2005 | Colledge et al. |
| 2005/0086047 A1 | 4/2005 | Uchimoto et al. |
| 2005/0108630 A1 | 5/2005 | Wasson et al. |
| 2005/0137853 A1 | 6/2005 | Appleby et al. |
| 2005/0155017 A1 | 7/2005 | Berstis et al. |
| 2005/0171757 A1 | 8/2005 | Appleby |
| 2005/0209844 A1 | 9/2005 | Wu et al. |
| 2005/0240392 A1 | 10/2005 | Munro, Jr. et al. |
| 2006/0004563 A1 | 1/2006 | Campbell et al. |
| 2006/0004653 A1 | 1/2006 | Strongin |
| 2006/0080079 A1 | 4/2006 | Yamabana |
| 2006/0095250 A1 | 5/2006 | Chen et al. |
| 2006/0217964 A1 | 9/2006 | Kamatani et al. |
| 2006/0224378 A1 | 10/2006 | Chino et al. |
| 2006/0293876 A1 | 12/2006 | Kamatani et al. |
| 2007/0010990 A1 | 1/2007 | Woo |
| 2007/0016398 A1 | 1/2007 | Buchholz |
| 2007/0083359 A1 | 4/2007 | Bender |
| 2007/0083505 A1 | 4/2007 | Ferrari et al. |
| 2007/0094006 A1 | 4/2007 | Todhunter et al. |
| 2007/0100601 A1 | 5/2007 | Kimura |
| 2007/0150800 A1 | 6/2007 | Betz et al. |
| 2007/0203688 A1 | 8/2007 | Fuji et al. |
| 2007/0250305 A1 | 10/2007 | Maxwell |
| 2008/0133218 A1 | 6/2008 | Zhou et al. |
| 2008/0228464 A1 | 9/2008 | Al-Onaizan et al. |
| 2008/0319947 A1 | 12/2008 | Latzina et al. |
| 2009/0063472 A1 | 3/2009 | Pell et al. |
| 2009/0070094 A1 | 3/2009 | Best et al. |
| 2010/0082324 A1 | 4/2010 | Itagaki et al. |
| 2011/0055188 A1 | 3/2011 | Gras |
| 2011/0072021 A1 | 3/2011 | Lu et al. |
| 2011/0191286 A1 | 8/2011 | Cho et al. |
| 2011/0258181 A1 | 10/2011 | Brdiczka et al. |
| 2011/0295864 A1 | 12/2011 | Betz et al. |
| 2011/0301941 A1 | 12/2011 | De Vocht |
| 2011/0307435 A1 | 12/2011 | Overell et al. |
| 2012/0023104 A1 | 1/2012 | Johnson et al. |
| 2012/0030226 A1 | 2/2012 | Holt et al. |
| 2012/0131060 A1 | 5/2012 | Heidasch et al. |
| 2012/0197628 A1 | 8/2012 | Best et al. |
| 2012/0197885 A1 | 8/2012 | Patterson |
| 2012/0203777 A1 | 8/2012 | Laroco, Jr. et al. |
| 2012/0221553 A1 | 8/2012 | Wittmer et al. |
| 2012/0246153 A1 | 9/2012 | Pehle |
| 2012/0296897 A1 | 11/2012 | Xin-Jing et al. |
| 2012/0310627 A1 | 12/2012 | Qi et al. |
| 2013/0013291 A1 | 1/2013 | Bullock et al. |
| 2013/0054589 A1 | 2/2013 | Cheslow |
| 2013/0091113 A1 | 4/2013 | Gras |
| 2013/0132383 A1 | 5/2013 | Ahlberg et al. |
| 2013/0138696 A1 | 5/2013 | Turdakov et al. |
| 2013/0144592 A1 | 6/2013 | Och et al. |
| 2013/0144594 A1 | 6/2013 | Bangalore et al. |
| 2013/0185307 A1 | 7/2013 | El-Yaniv et al. |
| 2013/0254209 A1 | 9/2013 | Kang et al. |
| 2013/0282703 A1 | 10/2013 | Puterman-Sobe et al. |
| 2013/0311487 A1 | 11/2013 | Moore et al. |
| 2013/0318095 A1 | 11/2013 | Harold |
| 2014/0012842 A1 | 1/2014 | Yan et al. |

OTHER PUBLICATIONS

Hutchins, "Machine Translation: past, present, future", (Ellis Horwood Series in Computers and their Applications) Ellis Horwooci: Chichester, 1986, 382 pp. ISBN 0-85312-788-3, $49.95 (hb).

Mitamura, et al,, "An Efficient Interlingua Translation System for Multi-Lingual Document Production", http://citeseerxist.psu.edu/viewdoc/surnmary?doi=10.1.1.44.5702, Jul. 1, 1991.

Nakashole, "Automatic Extraction of Facts, Relations, and Entities for Web-Scale Knowledge Base Population", Dissertation for the Doctor of Engineering Degree, Faculty of Natural Sciences and Technology, 2012, 153 pages, Saarbrucken, Germany.

Zhao et al., "Corroborate arid Learn Facts from the Web", Industrial arid Government Track Paper, KDD'07, Aug. 12-15, 2007, 9 pages, San Jose, California, USA.

Boden et al., "FactCrawl: A Fact Retrieval Framework for Full-Text indices", WebDB Workshop, Jun. 12-16, 2011, 6 pages, Athens, Greece.

Zhao et al., "Corroborate and Learn Facts from the Web", KDD'07, Mar. 6, 2008, 28 pages.

Nie et al., "Statistical Entity Extraction from Web", Manuscript ID 0094-SIP-2011-PIEEE.R1, Jun. 15, 2011, 12 pages, Microsoft Research Asia, Beijing, China.

| This | boy | is | smart | he' | ll | succeed | in | life |
|---|---|---|---|---|---|---|---|---|
| this<br><Pronoun, GTNoun, PersonThird> | boy<br><Noun, Masc, Nominativ, GTNoun, Singular> | be<br><Verb, GTVerb, Singular, PersonThird, ZeroType, Present, Nonnegative, NoCompositeness> | smart<br><Adjective, DegreePositive, GTAdjectiveAttr, FullComparison> | he<br><Pronoun, Nominative \| Accusative, GTNoun, Masculine, Singular, PersonThird, RCPersonal, Unreflexive> | shall<br><Verb, GTVerbModal, ZeroType, Present, Nonnegative, Composite_ll> | succeed<br><Verb, GTInfinitive, NumberZero, PersonZero, ZeroType, TenseZero, Nonnegative> | in<br><Adverb, GTAdverb> | life<br><Adjective, DegreePositive, GTAdjectiveAttr> |
| this<br><Invariable> | | be<br><Verb, GTVerb, Singular, PersonThird, ZeroType, Present, Nonnegative, Regular, Composite_for_t> | smart<br><Verb, GTVerb, Singular, PersonFirst \| PersonSecond, ZeroType, Present, Nonnegative, NoCompositeness> | | will<br><Verb, GTVerbModal, ZeroType, Present, Nonnegative, Irregular, Composite_ll> | succeed<br><Verb, GTVerb, Singular, PersonFirst \| PersonSecond, ZeroType, Present, Nonnegative, NoCompositeness> | in<br><Preposition> | life<br><Noun, Nominative \| Accusative, GTNoun, Singular> |
| this<br><Pronoun, GTAdjectiveAttr, Singular, RCDemonstrative> | | | smart<br><Verb, GTVerb, Plural, ZeroType, Present, Nonnegative, NoCompositeness> | | | succeed<br><Verb, GTInfinitive, NumberZero, PersonZero, ZeroType, TenseZero, Nonnegative> | | |
| | | | smart<br><Verb, GTInfinitive, NumberZero, PersonZero, ZeroType, TenseZero, Nonnegative> | | | | | |
| | | | smart<br><Adverb, DegreePositive, GTAdverb, FullComparison> | | | | | |
| | | | smart<br><Noun, Nominative \| Accusative, GTNoun, Singular> | | | | | |

Fig. 3

CREATING ONTOLOGIES BY ANALYZING NATURAL LANGUAGE TEXTS

CROSS REFERENCE TO RELATED APPLICATIONS

This application claims the benefit of priority to Russian patent application No. RU2014147623, filed Nov. 26, 2014; disclosure of which is incorporated herein by reference in its entirety.

TECHNICAL FIELD

The present disclosure is generally related to computer systems, and is more specifically related to systems and methods for natural language processing.

BACKGROUND

Interpreting unstructured information represented by a natural language text may be hindered by polysemy which is an intrinsic feature of natural languages. Identification, comparison and determining the degree of similarity of semantically similar language constructs may facilitate the task of interpreting natural language texts.

SUMMARY OF THE DISCLOSURE

In accordance with one or more aspects of the present disclosure, an example method may comprise: receiving a plurality of semantic structures associated with a text corpus; identifying, by a processing device, a first semantic structure and a second semantic structure, wherein the first semantic structure comprises a first substructure and a second substructure, wherein the second semantic structure comprises a third substructure and a fourth substructure, and wherein the first substructure is similar to the third substructure in view of a first similarity criterion; and responsive to determining that the second substructure is similar to the fourth substructure in view of a second similarity criterion, associating, with a certain concept of an ontology associated with the text corpus, objects represented by the second substructure and the fourth substructure.

In accordance with one or more aspects of the present disclosure, an example system may comprise: a memory; and a processor, coupled to the memory, the processor configured to: receiving a plurality of semantic structures associated with a text corpus; identify a first semantic structure and a second semantic structure, wherein the first semantic structure comprises a first substructure and a second substructure, wherein the second semantic structure comprises a third substructure and a fourth substructure, and wherein the first substructure is similar to the third substructure in view of a first similarity criterion; and responsive to determining that the second substructure is similar to the fourth substructure in view of a second similarity criterion, associate, with a certain concept of an ontology associated with the text corpus, objects represented by the second substructure and the fourth substructure.

In accordance with one or more aspects of the present disclosure, an example computer-readable non-transitory storage medium may comprise executable instructions that, when executed by a computing device, cause the computing device to perform operations comprising: receiving a plurality of semantic structures associated with a text corpus; identifying, by a processing device, a first semantic structure and a second semantic structure, wherein the first semantic structure comprises a first substructure and a second substructure, wherein the second semantic structure comprises a third substructure and a fourth substructure, and wherein the first substructure is similar to the third substructure in view of a first similarity criterion; and responsive to determining that the second substructure is similar to the fourth substructure in view of a second similarity criterion, associating, with a certain concept of an ontology associated with the text corpus, objects represented by the second substructure and the fourth substructure.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 schematically illustrates an example of a lexico-morphological structure of a sentence, in accordance with one or more aspects of the present disclosure;

DETAILED DESCRIPTION

Figure 1:
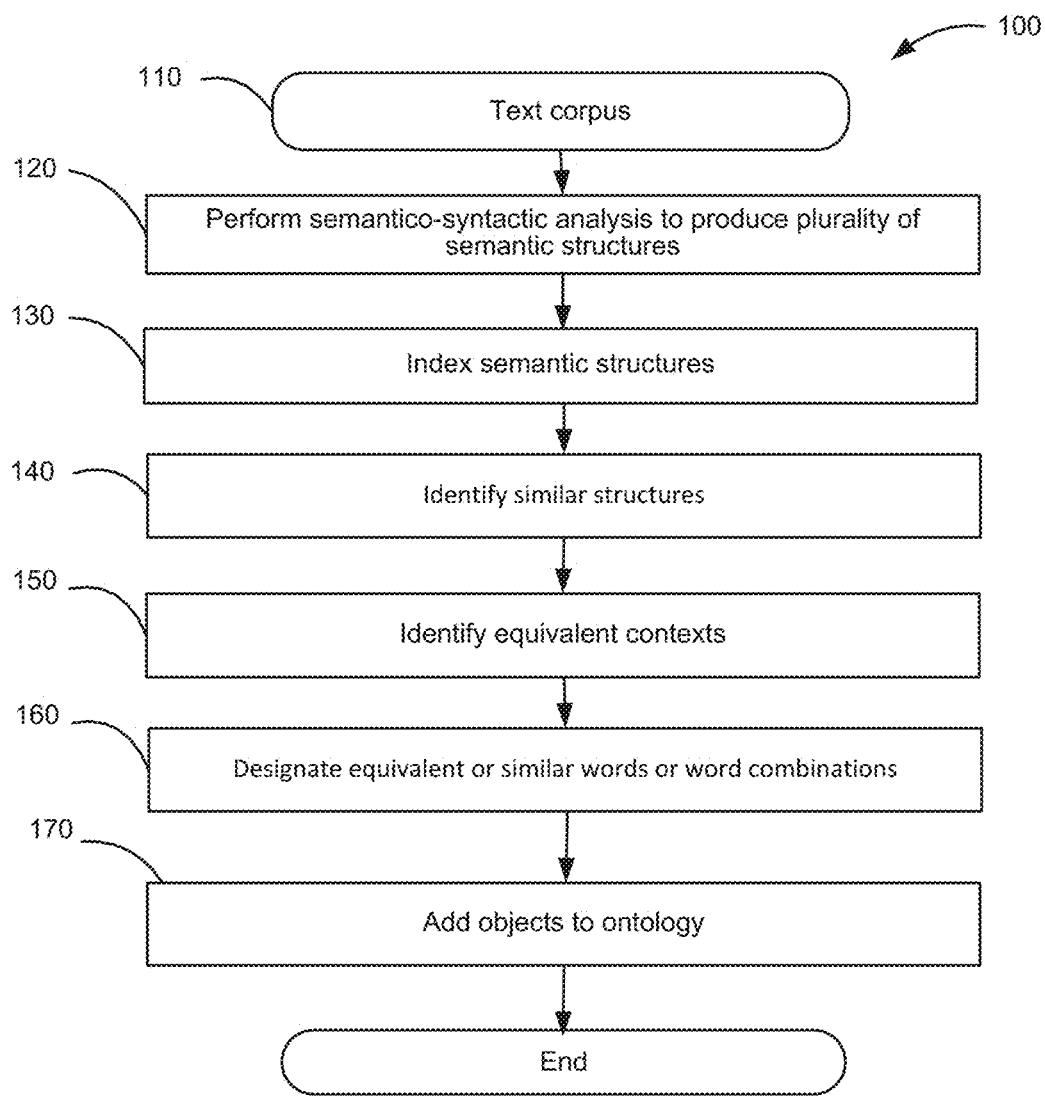
FIG. 1 depicts a flow diagram of one illustrative example of a method for creating ontologies by analyzing natural language texts, in accordance with one or more aspects of the present disclosure.

Described herein are methods and systems for creating ontologies by analyzing natural language texts.

"Ontology" herein shall refer to a model representing objects pertaining to a certain branch of knowledge (subject area) and relationships among such objects. An ontology may comprise definitions of a plurality of classes, such that each class corresponds to a concept of the subject area. Each class definition may comprise definitions of one or more objects associated with the class. Following the generally accepted terminology, an ontology class may also be referred to as concept, and an object belonging to a class may also be referred to as an instance of the concept.

In an illustrative example, class "Person" may be associated with one or more objects corresponding to certain persons. Each class definition may further comprise one or more relationship definitions describing the types of relationships that may be associated with the objects of the class. Each class definition may further comprise one or more restrictions defining certain properties of the objects of the class. In certain implementations, a class may be an ancestor or a descendant of another class.

An object definition may represent a real life material object (such as a person or a thing) or a certain notion associated with one or more real life objects (such as a number or a word). In certain implementations, an object may be associated with two or more classes. An ontology may be an ancestor or/and a descendant of another ontology, in which case concepts and properties of the ancestor ontology would also pertain to the descendant ontology.

The present disclosure provides system and methods for identifying, by a computing device, alternative semantic structures representing similar or identical objects, facts, features, or phenomena, and for associating the identified semantic structures with the corresponding classes and objects of an ontology that is associated with the natural language text field being analyzed.

"Computing device" herein shall refer to a data processing device having a general purpose processor, a memory, and at least one communication interface. Examples of computing devices that may employ the methods described herein include, without limitation, desktop computers, notebook computers, tablet computers, and smart phones.

In accordance with one or more aspects of the present disclosure, the computing device implementing the method may perform syntactic and semantic analysis of a plurality of natural language texts belonging to a certain text corpus, to produce a plurality of language independent semantic structures.

The computing device may then identify, within the plurality of semantic structures, a first semantic structure and a second semantic structures, such that the first semantic structure comprises a first substructure, which is similar, in view of a certain similarity criterion, to a second substructure comprised by the second semantic structure. The similarity criterion may represent at least partial equivalence of the two substructures. Thus, in various illustrative examples, the two similar substructures may be considered equivalent. In an illustrative example, each of the similar substructures may comprise two parts (referred to as "left context" and "right context" to indicate that they are surrounding the respective remaining substructures of the first semantic structure and the second semantic structure).

Responsive to identifying the two semantic structures comprising similar substructures, the computing device may assert a hypothesis of similarity of the respective interior contexts of the first semantic structure and second semantic structure (wherein each interior context is surrounded by the respective left and right contexts). The hypothesis may then be tested, e.g., by identifying, within the same text corpus, two semantic structures that are different from the first semantic structure and the second semantic structure, and include substructures the semantic similarity or equivalency of which is being tested (i.e., the third substructure and the fourth substructure representing the respective interior contexts), while the remaining parts of the newly identified semantic structures are similar (e.g., in view of the same similarity criterion that was employed for establishing the similarity of the first substructure and the second substructure). Upon confirming the hypothesis, the computing device may define the objects represented by the respective interior contexts of the two semantic structures (i.e., the third substructure and the fourth substructure) as instances of a certain concept of an ontology associated with a certain knowledge domain.

Various aspects of the above referenced methods and systems are described in details herein below by way of examples, rather than by way of limitation.

FIG. 1 depicts a flow diagram of one illustrative example of a method 100 for creating ontologies by analyzing natural language texts, in accordance with one or more aspects of the present disclosure. Method 100 and/or each of its individual functions, routines, subroutines, or operations may be performed by one or more processors of the computing device (e.g., computing device 100 of FIG. 1) implementing the method. In certain implementations, method 100 may be performed by a single processing thread. Alternatively, method 100 may be performed by two or more processing threads, each thread implementing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other.

At block 120, the computing device implementing the method may perform a semantico-syntactic analysis of an input text corpus 110 to produce a plurality of language independent semantic structures, as described in more details herein below.

At block 130, the computing device may create an index of the plurality of semantic structures, as described in more details herein below. The index may be employed for identifying certain elements within the semantic structures, and thus may facilitate identifying semantic structures that are related in a certain manner (e.g., similar in view of certain similarity criteria).

At block 140, the computing device may identify two semantic structures, such that the first identified semantic structure comprises a first substructure, which is similar, in view of a certain similarity criterion, to a second substructure comprised by the second identified semantic structure. The similarity criterion may represent at least partial equivalence of the two substructures, as described in more details herein below.

In an illustrative example, each of the identified similar substructures may comprise two parts (referred to as "left context" and "right context" to indicate that they are surrounding the respective remaining substructures of the first semantic structure and the second semantic structure).

At block 150, the computing device may ascertain that the respective interior contexts of the first semantic structure and second semantic structure (wherein each interior context is surrounded by the respective left and right contexts) are similar in view of a certain similarity criterion.

At block 160, the computing device may designate the words or word combinations corresponding to the interior contexts of the two semantic structures as being semantically similar or equivalent.

At block 170, the computing device may define the objects represented by the respective interior contexts of the two semantic structures (i.e., the third substructure and the fourth substructure) as instances of a certain concept of an ontology associated with the text corpus, as described in more details herein below, and the method may loop back to block 140.

Figure 2:
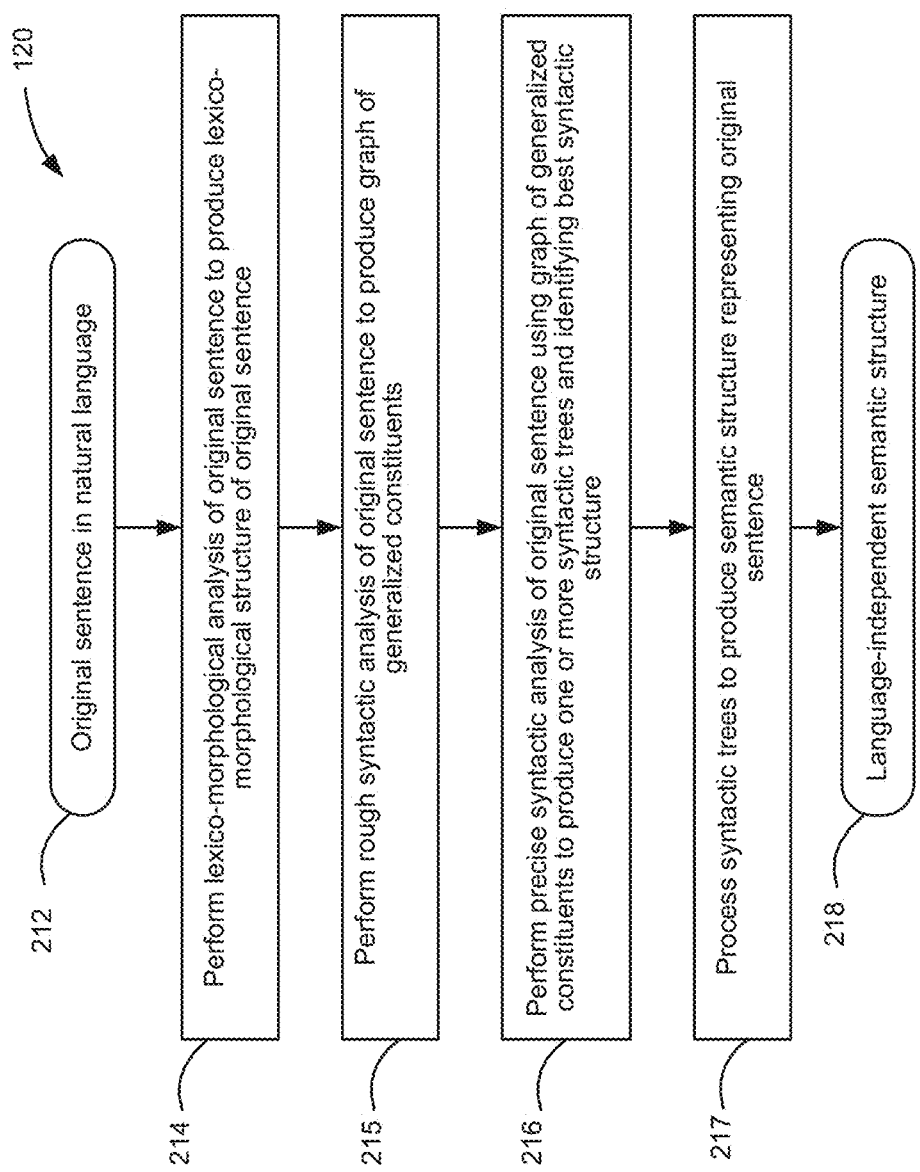
FIG. 2 depicts a flow diagram of one illustrative example of a method 200 for performing a semantico-syntactic analysis of a natural language sentence 212, in accordance with one or more aspects of the present disclosure.

FIG. 2 depicts a flow diagram of one illustrative example of a method 200 for performing a semantico-syntactic analysis of a natural language sentence 212, in accordance with one or more aspects of the present disclosure. Method 200 may be applied to one or more syntactic units (e.g., sentences) comprised by a certain text corpus, in order to produce a plurality of semantico-syntactic trees corresponding to the syntactic units. In various illustrative examples, the natural language sentences to be processed by method 200 may be retrieved from one or more electronic documents which may be produced by scanning or otherwise acquiring images of paper documents and performing optical character recognition (OCR) to produce the texts associated with the documents. The natural language sentences may be also retrieved from various other sources including electronic mail messages, social networks, digital content files processed by speech recognition methods, etc.

At block 214, the computing device implementing the method may perform lexico-morphological analysis of sentence 212 to identify morphological meanings of the words comprised by the sentence. "Morphological meaning" of a word herein shall refer to one or more lemma (i.e., canonical or dictionary forms) corresponding to the word and a corresponding set of values of grammatical attributes defining the grammatical value of the word. Such grammatical attributes may include the lexical category (part of speech) of the word and one or more morphological and/or grammatical attributes (e.g., grammatical case, gender, number, conjugation type, etc.). Due to homonymy and/or coinciding grammatical forms corresponding to different lexico-morphological meanings of a certain word, two or more morphological meanings may be identified for a given word. An illustrative example of performing lexico-morphological analysis of a sentence is described in more details herein below with references to FIG. 3.

At block 215, the computing device may perform a rough syntactic analysis of sentence 212. The rough syntactic analysis may include applying of one or more syntactic models which may be associated with items of the sentence 212 followed by identification of the surface (i.e., syntactic) associations within sentence 212, in order to produce a graph of generalized constituents. "Constituent" herein shall refer to a contiguous group of words of the original sentence, which behaves as a single grammatical entity. A constituent comprises a core represented by one or more words, and may further comprise one or more child constituents at lower levels. A child constituent is a dependent constituent and may be associated with one or more parent constituents.

At block 216, the computing device may perform a precise syntactic analysis of sentence 212, to produce one or more syntactic trees of the sentence. The pluralism of possible syntactic trees corresponding to a given original sentence may stem from homonymy and/or coinciding grammatical forms corresponding to different lexico-morphological meanings of one or more words within the original sentence. Among the multiple syntactic trees, one or more best syntactic tree corresponding to sentence 212 may be selected, based on a certain rating function talking into account compatibility of lexical meanings of the original sentence words, surface relationships, deep relationships, etc.

At block 217, the computing device may process the syntactic trees to the produce a semantic structure 218 corresponding to sentence 212. Semantic structure 218 may comprise a plurality of nodes corresponding to semantic classes, and may further comprise a plurality of edges corresponding to semantic relationships, as described in more details herein below.

FIG. 3 schematically illustrates an example of a lexico-morphological structure of a sentence, in accordance with one or more aspects of the present disclosure. Example lexical-morphological structure 300 may comprise having a plurality of "lexical meaning-grammatical value" pairs for example sentence 320. In an illustrative example, "11" may be associated with lexical meaning "shall" 312 and "will" 314. The grammatical value associated with lexical meaning 312 is <Verb, GTVerbModal, ZeroType, Present, Nonnegative, Composite II>. The grammatical value associated with lexical meaning 314 is <Verb, GTVerbModal, ZeroType, Present, Nonnegative, Irregular, Composite II>.

Figure 4:
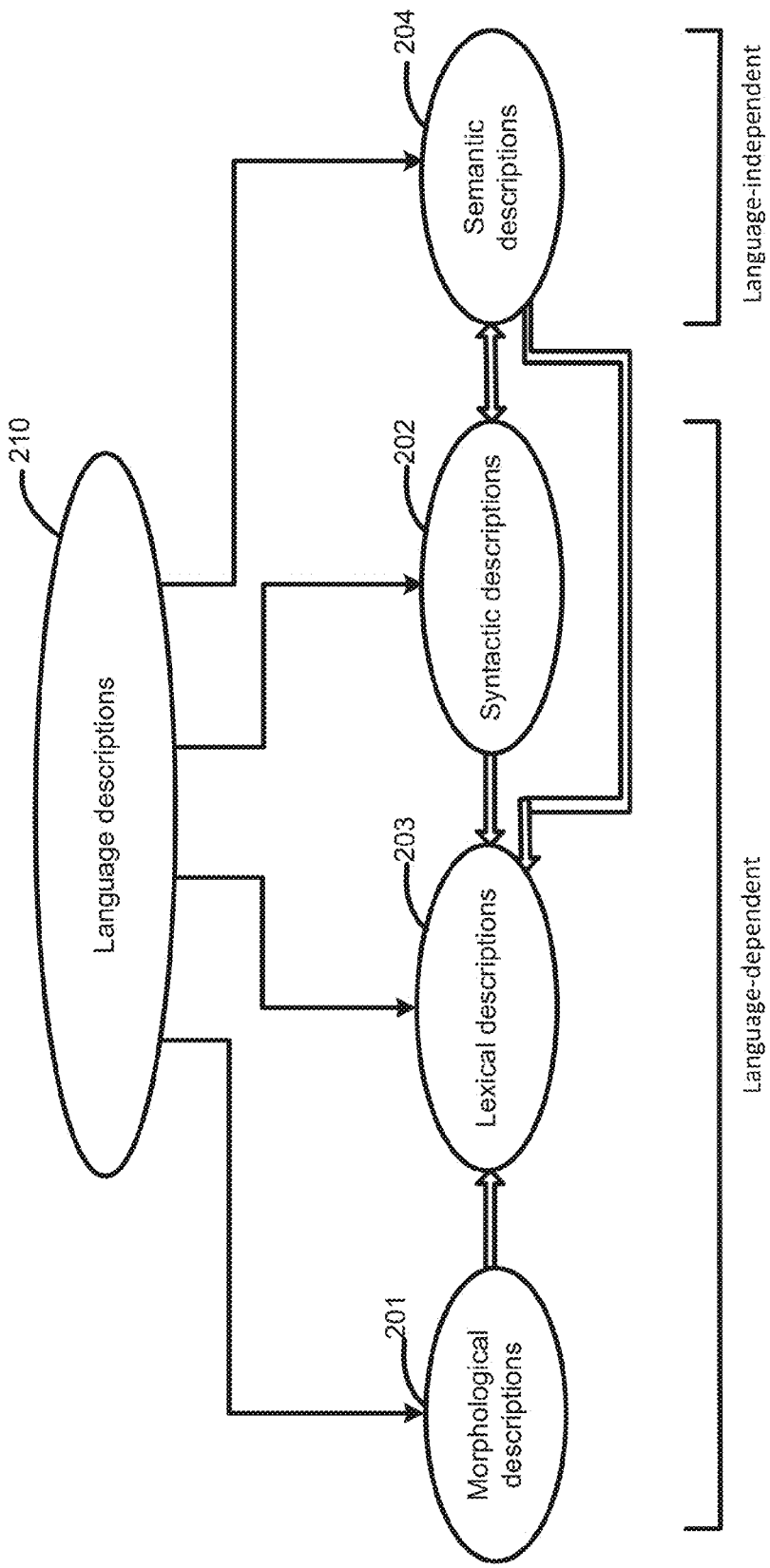
FIG. 4 schematically illustrates language descriptions representing a model of a natural language, in accordance with one or more aspects of the present disclosure.

FIG. 4 schematically illustrates applied language descriptions 410 including morphological descriptions 101, lexical descriptions 103, syntactic descriptions 102, and semantic descriptions 104, and their relationship thereof. Among them, morphological descriptions 101, lexical descriptions 103, and syntactic descriptions 102 are language-specific. A set of language descriptions 210 represent a model of a certain natural language.

In an illustrative example, a certain lexical meaning of lexical descriptions 203 may be associated with one or more surface models of syntactic descriptions 202 corresponding to this lexical meaning A certain surface model of syntactic descriptions 202 may be associated with a deep model of semantic descriptions 204.

Figure 5:
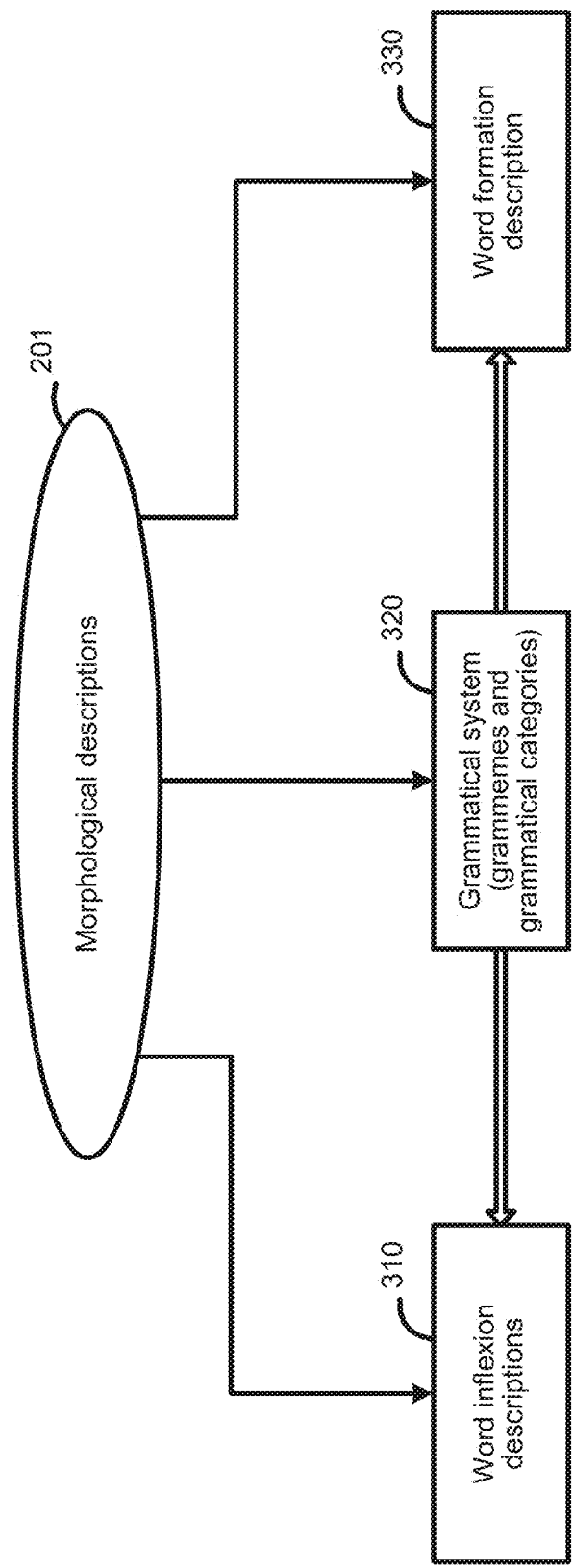
FIG. 5 schematically illustrates examples of morphological descriptions, in accordance with one or more aspects of the present disclosure.

FIG. 5 schematically illustrates several examples of morphological descriptions. Components of the morphological descriptions 201 may include: word inflexion descriptions 310, grammatical system 320, and word formation descriptions 330, among others. Grammatical system 320 comprises a set of grammatical categories, such as, part of speech, grammatical case, grammatical gender, grammatical number, grammatical person, grammatical reflexivity, grammatical tense, grammatical aspect, and their values (also referred to as "grammemes"), including, for example, adjective, noun, or verb; nominative, accusative, or genitive case; feminine, masculine, or neutral gender; etc. The respective grammemes may be utilized to produce word inflexion description 310 and the word formation description 330.

Word inflexion descriptions 310 describe the forms of a given word depending upon its grammatical categories (e.g., grammatical case, grammatical gender, grammatical number, grammatical tense, etc.), and broadly includes or describes various possible forms of the word. Word formation description 330 describes which new words may be constructed based on a given word (e.g., compound words).

According to one aspect of the present disclosure, syntactic relationships among the elements of the original sentence may be established using a constituent model. A constituent may comprise a group of neighboring words in a sentence that behaves as a single entity. A constituent has a word at its core and may comprise child constituents at lower levels. A child constituent is a dependent constituent and may be associated with other constituents (such as parent constituents) for building the syntactic descriptions 102 of the original sentence.

Figure 6:
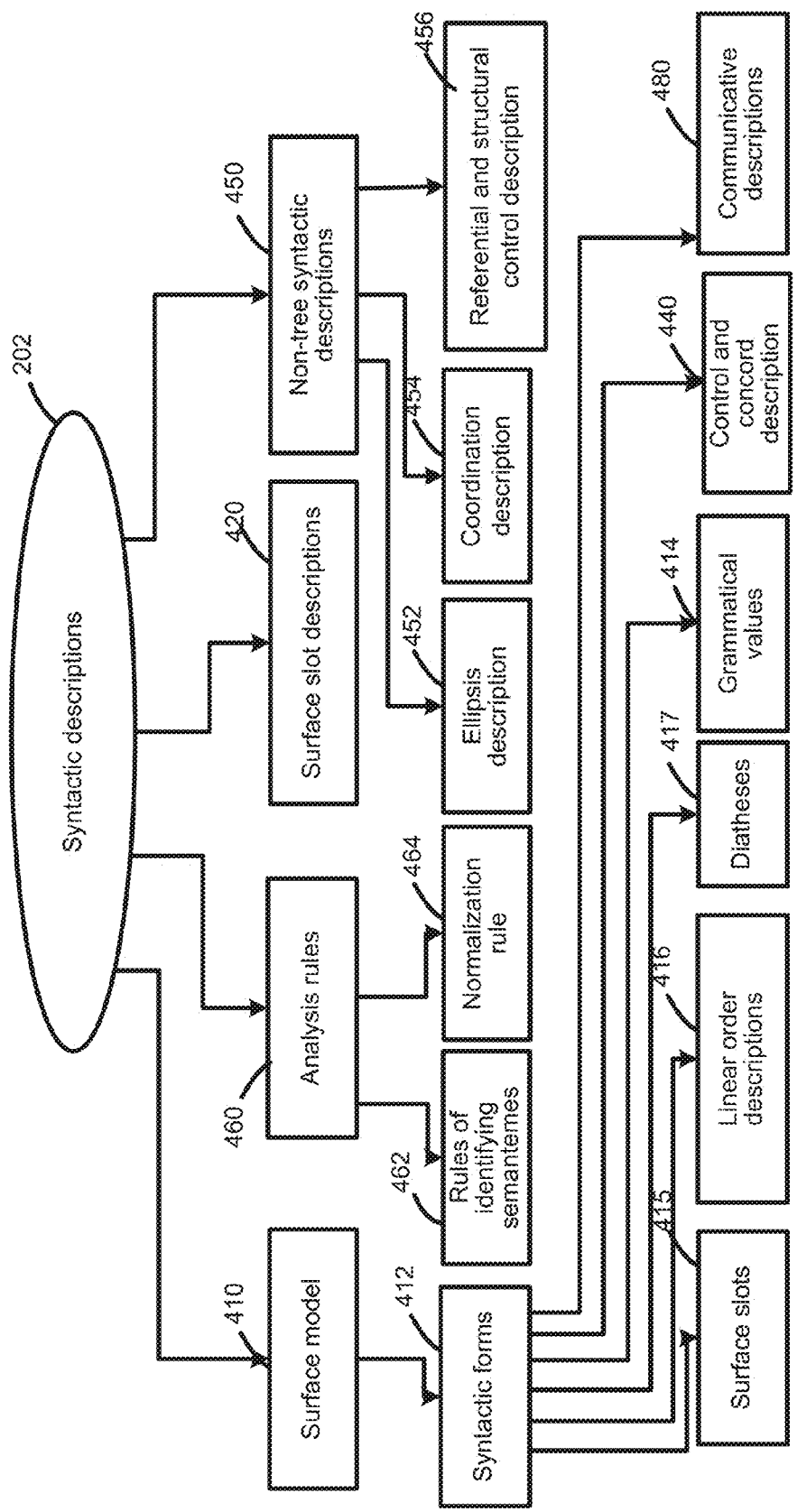
FIG. 6 schematically illustrates examples of syntactic descriptions, in accordance with one or more aspects of the present disclosure.

FIG. 6 illustrates exemplary syntactic descriptions. The components of the syntactic descriptions 102 may include, but are not limited to, surface models 410, surface slot descriptions 420, referential and structural control description 456, control and concord description 440, non-tree syntactic description 450, and analysis rules 460. Syntactic descriptions 102 may be used to construct possible syntactic structures of the original sentence in a given natural language, taking into account free linear word order, non-tree syntactic phenomena (e.g., coordination, ellipsis, etc.), referential relationships, and other considerations.

Surface models 410 may be represented as aggregates of one or more syntactic forms ("syntforms" 412) employed to describe possible syntactic structures of the sentences that are comprised by syntactic description 102. In general, the lexical meaning of a natural language word may be linked to surface (syntactic) models 410. A surface model may represent constituents which are viable when the lexical meaning functions as the "core." A surface model may include a set of surface slots of the child elements, a description of the linear order, and/or diatheses. "Diathesis" herein shall refer to a certain relationship between surface slots and their semantic roles expressed by means corresponding deep slots.

Figure 7:
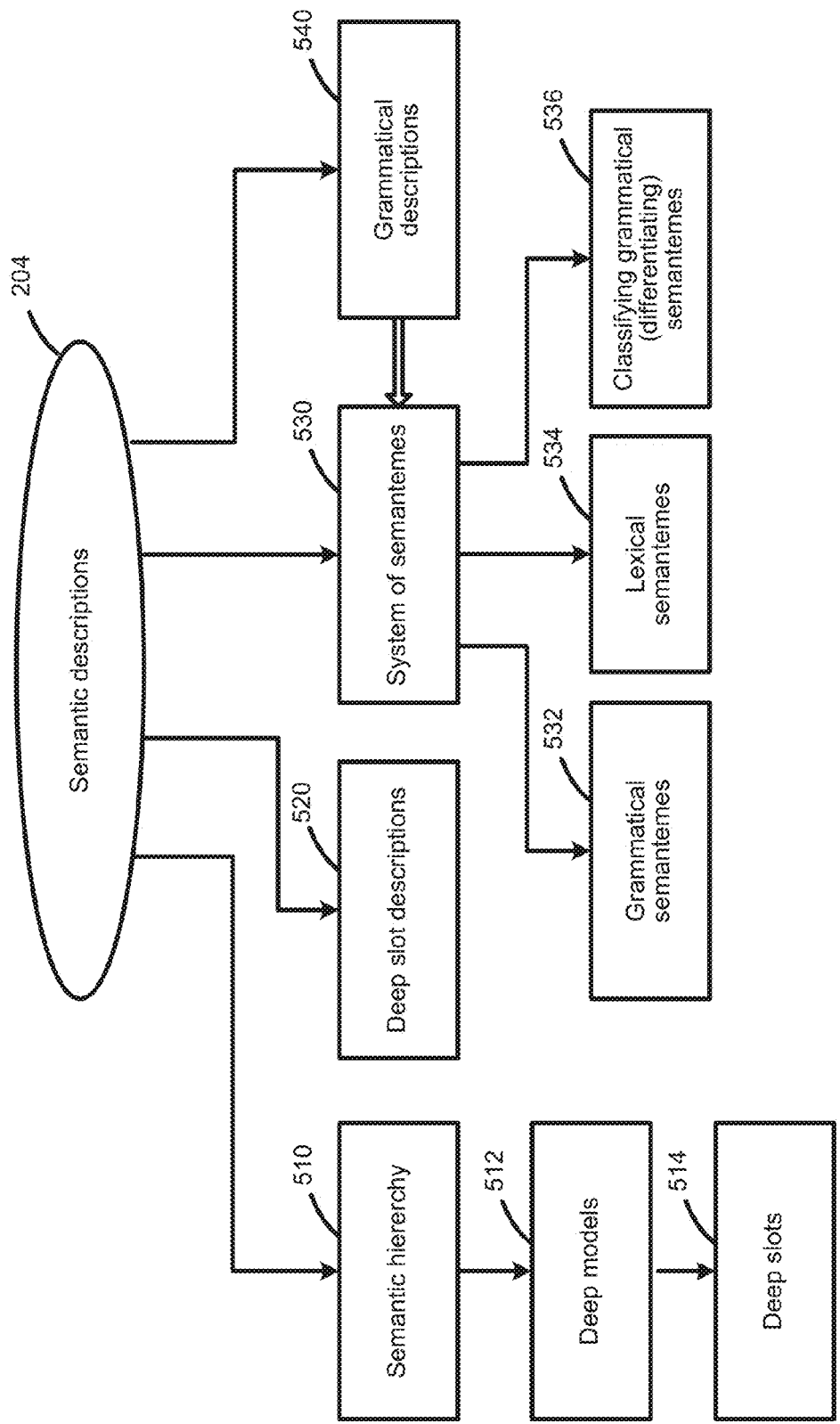
FIG. 7 schematically illustrates examples of semantic descriptions, in accordance with one or more aspects of the present disclosure.

A constituent model may utilize a plurality of surface slots 415 of the child constituents and their linear order descriptions 416 to describe grammatical values 414 of possible fillers of these surface slots. Diatheses 417 represent relationships between surface slots 415 and deep slots 514 (as shown in FIG. 7). Communicative descriptions 480 describe communicative order in a sentence.

Linear order description 416 may be represented by linear order expressions reflecting the sequence in which various surface slots 415 may appear in the sentence. The linear order expressions may include names of variables, names of surface slots, parenthesis, grammemes, the "or" operator, etc. In an illustrative example, a linear order description of a simple sentence of "Boys play football" may be represented as "Subject Core Object_Direct," where Subject, Core, and Object_Direct are the names of surface slots 415 corresponding to the word order.

Communicative descriptions 480 may describe a word order in a syntform 412 from the point of view of communicative acts that are represented as communicative order expressions, which are similar to linear order expressions. The control and concord description 440 may comprise rules and restrictions which are associated with grammatical values of the related constituents and may be used in performing syntactic analysis.

Non-tree syntax descriptions 450 may be created to reflect various linguistic phenomena, such as ellipsis and coordination, and may be used in syntactic structures transformations which are generated at various stages of the analysis according to one or more aspects of the present disclosure. Non-tree syntax descriptions 450 may include ellipsis description 452, coordination description 454, as well as referential and structural control description 430, among others.

Analysis rules 460 may generally describe properties of a specific language and may be used in performing semantic analysis 150. Analysis rules 460 may comprise rules of identifying semantemes 462 and normalization rules 464. Normalization rules 464 may be used for describing language-dependent transformations of semantic structures.

FIG. 7 illustrates exemplary semantic descriptions. Components of semantic descriptions 104 are language-independent and may include, but are not limited to, a semantic hierarchy 510, deep slots descriptions 520, a set of semantemes 530, and pragmatic descriptions 540.

The core of the semantic descriptions may be represented by semantic hierarchy 510 which may comprise semantic notions (semantic entities) which are also referred to as semantic classes. The latter may be arranged into hierarchical structure reflecting parent-child relationships. In general, a child semantic class may inherits one or more properties of its direct parent and other ancestor semantic classes. In an illustrative example, semantic class SUBSTANCE is a child of semantic class ENTITY and the parent of semantic classes GAS, LIQUID, METAL, WOOD_MATERIAL, etc.

Each semantic class in semantic hierarchy 510 may be associated with a corresponding deep model 512. Deep model 512 of a semantic class may comprise a plurality of deep slots 514 which may reflect semantic roles of child constituents in various sentences that include objects of the semantic class as the core of the parent constituent. Deep model 512 may further comprise possible semantic classes acting as fillers of the deep slots. Deep slots 514 may express semantic relationships, including, for example, "agent," "addressee," "instrument," "quantity," etc. A child semantic class may inherit and further expand the deep model of its direct parent semantic class.

Deep slots descriptions 520 reflect semantic roles of child constituents in deep models 512 and may be used to describe general properties of deep slots 514. Deep slots descriptions 520 may also comprise grammatical and semantic restrictions associated with the fillers of deep slots 514. Properties and restrictions associated with deep slots 514 and their possible fillers in various languages may be substantially similar and often identical. Thus, deep slots 514 are language-independent.

Set of semantemes 530 may represents a plurality of semantic categories and semantemes which represent meanings of the semantic categories. In an illustrative example, a semantic category "DegreeOfComparison" may be used to describe the degree of comparison of adjectives and may comprise the following semantemes: "Positive," "ComparativeHigherDegree," and "SuperlativeHighestDegree," among others. In another illustrative example, a semantic category "RelationToReferencePoint" may be used to describe an order (spatial or temporal in a broad sense of the words being analyzed), such as before or after a reference point or an event, and may comprise the semantemes "Previous" and "Subsequent.". In yet another illustrative example, a semantic category "EvaluationObjective" can be used to describe an objective assessment, such as "Bad," "Good," etc.

Set of semantemes 530 may include language-independent semantic attributes which may express not only semantic properties but also stylistic, pragmatic and communicative properties. Certain semantemes may be used to express an atomic meaning which corresponds to a regular grammatical and/or lexical expression in a natural language. By their intended purpose and usage, sets of semantemes may be categorized, e.g., as grammatical semantemes 532, lexical semantemes 534, and classifying grammatical (differentiating) semantemes 536.

Grammatical semantemes 532 may be used to describe grammatical properties of the constituents when transforming a syntactic tree into a semantic structure. Lexical semantemes 534 may describe specific properties of objects (e.g., "being flat" or "being liquid") and may be used in deep slot descriptions 520 as restriction associated with the deep slot fillers (e.g., for the verbs "face (with)" and "flood," respectively). Classifying grammatical (differentiating) semantemes 536 may express the differentiating properties of objects within a single semantic class. In an illustrative example, in the semantic class of HAIRDRESSER, the semanteme of <<RelatedToMen>> is associated with the lexical meaning of "barber," to differentiate from other lexical meanings which also belong to this class, such as "hairdresser," "hairstylist," etc. Using these language-independent semantic properties that may be expressed by elements of semantic description, including semantic classes, deep slots, and semantemes, may be employed for extracting the semantic information, in accordance with one or more aspects of the present invention.

Pragmatic descriptions 540 allow associating a certain theme, style or genre to texts and objects of semantic hierarchy 510 (e.g., "Economic Policy," "Foreign Policy," "Justice," "Legislation," "Trade," "Finance," etc.). Pragmatic properties may also be expressed by semantemes. In an illustrative example, the pragmatic context may be taken into consideration during the semantic analysis phase.

Figure 8:
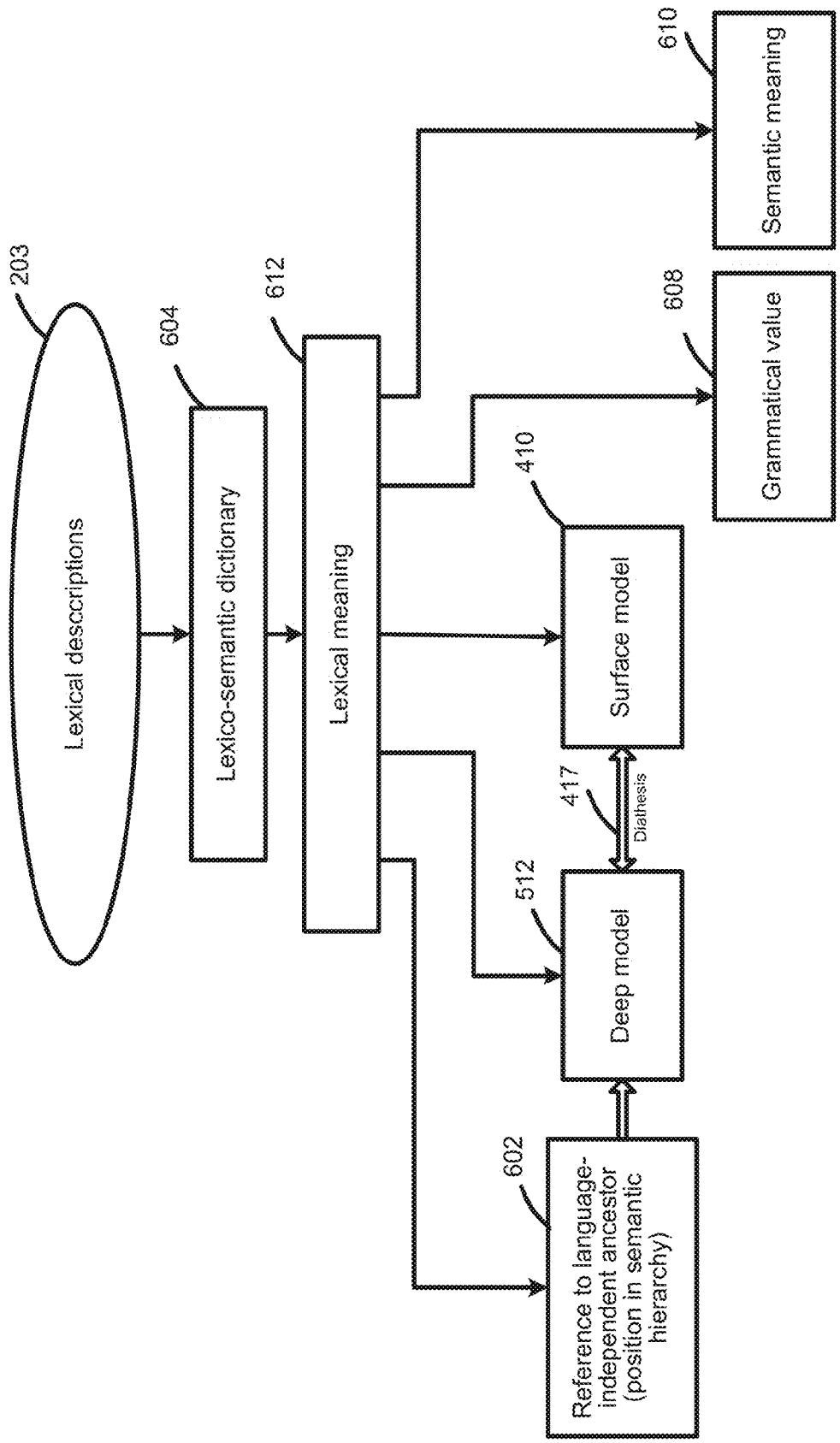
FIG. 8 schematically illustrates examples of lexical descriptions, in accordance with one or more aspects of the present disclosure.

FIG. 8 illustrates exemplary lexical descriptions. Lexical descriptions 203 represent a plurality of lexical meanings 612, in a certain natural language. For a lexical meaning 612, there is a relationship 602 to its language-independent semantic parent to indicate the location of a given lexical meaning in semantic hierarchy 510.

A lexical meaning 612 in the lexical-semantic hierarchy 510 may be associated with a surface model 410 which, in turn, may be associated, by one or more diatheses 417, with a corresponding deep model 512. A lexical meaning 612 may inherit the semantic class of its parent, and may further specify its deep model 152.

A surface model 410 of a lexical meaning may comprise includes one or more syntforms 412. A syntform, 412 of a surface model 410 may comprise one or more surface slots 415, including their respective linear order descriptions 416, one or more grammatical values 414 expressed as a set of grammatical categories (grammemes), one or more semantic restrictions associated with surface slot fillers, and one or more of the diatheses 417. Semantic restrictions associated with a certain surface slot filler may be represented by one or more semantic classes, whose objects can fill the surface slot.

Figure 9:
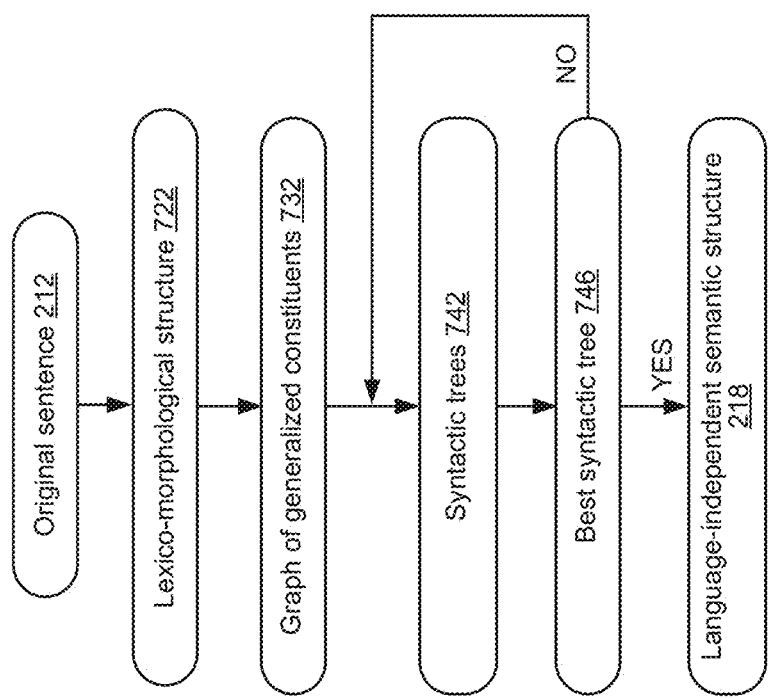
FIG. 9 schematically illustrates example data structures that may be employed by one or more methods implemented in accordance with one or more aspects of the present disclosure.

FIG. 9 schematically illustrates example data structures that may be employed by one or more methods described herein. Referring again to FIG. 2, at block 214, the computing device implementing the method may perform lexico-morphological analysis of sentence 212 to produce a lexico-morphological structure 722 of FIG. 9. Lexico-morphological structure 722 may comprise a plurality of mapping of a lexical meaning to a grammatical value for each lexical unit (e.g., word) of the original sentence. FIG. 3 schematically illustrates an example of a lexico-morphological structure.

At block 215, the computing device may perform a rough syntactic analysis of original sentence 212, in order to produce a graph of generalized constituents 732 of FIG. 9. Rough syntactic analysis involves applying one or more possible syntactic models of possible lexical meanings to each element of a plurality of elements of the lexico-morphological structure 722, in order to identify a plurality of potential syntactic relationships within original sentence 212, which are represented by graph of generalized constituents 732.

Graph of generalized constituents 732 may be represented by an acyclic graph comprising a plurality of nodes corresponding to the generalized constituents of original sentence 212, and further comprising a plurality of edges corresponding to the surface (syntactic) slots, which may express various types of relationship among the generalized lexical meanings. The method may apply a plurality of potentially applicable syntactic models for each element of a plurality of elements of the lexico-morphological structure of original sentence 212 in order to produce a set of constituents of original sentence 212. Then, the method may consider a plurality of the constituents of original sentence 212 in order to produce graph of generalized constituents 732 based on a set of constituents. Graph of generalized constituents 732 at the level of the surface model may reflect a plurality of relationships among the words of original sentence 212. As the number of viable syntactic structures may be relatively large, graph of generalized constituents 732 may generally comprise redundant information, including relatively large quantity of lexical meanings for certain nodes and/or surface slots for certain edges of the graph.

Graph of generalized constituents 732 may be initially built as a tree, starting with the terminal nodes (leaves) and moving towards the root, by adding child components to fill surface slots 415 of a plurality of parent constituents in order to cover all lexical units of original sentence 212.

Figure 10:
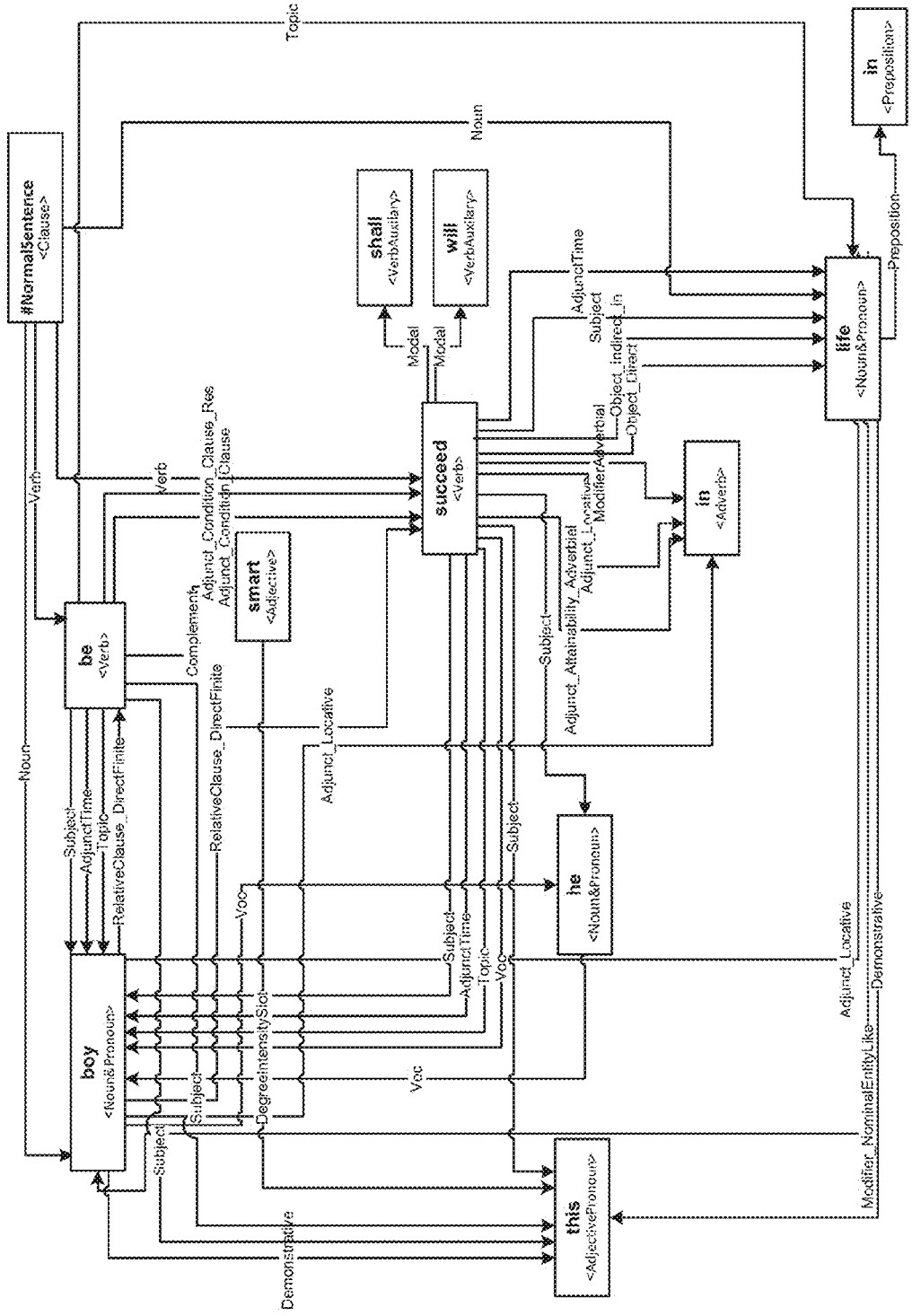
FIG. 10 schematically illustrates an example graph of generalized constituents, in accordance with one or more aspects of the present disclosure.

In certain implementations, the root of graph of generalized constituents 732 represents a predicate. In the course of the above described process, the tree may become a graph, as certain constituents of a lower level may be included into one or more constituents of an upper level. A plurality of constituents that represent certain elements of the lexico-morphological structure may then be generalized to produce generalized constituents. The constituents may be generalized based on their lexical meanings or grammatical values 414, e.g., based on part of speech and their relationships. FIG. 10 schematically illustrates an example graph of generalized constituents.

At block 216, the computing device may perform a precise syntactic analysis of sentence 212, to produce one or more syntactic trees 742 of FIG. 9 based on graph of generalized constituents 732. For each of one or more syntactic trees, the computing device may determine an integral rating based on certain calculations and a priori estimates. The tree having the optimal rating may be selected for producing the best syntactic structure 746 of original sentence 212.

In the course of producing the syntactic structure 746 based on the selected syntactic tree, the computing device may establish one or more non-tree links (e.g., by establishing additional link among at least two nodes of the graph). If that process fails, the computing device may select a syntactic tree having a suboptimal rating closest to the optimal rating, and may attempt to establish one or more non-tree relationships within that tree. Finally, the precise syntactic analysis produces a syntactic structure 746 which represents the best syntactic structure corresponding to original sentence 212. In fact, selecting the best syntactic structure 746 also produces the best lexical values 240 for items of original sentence 212.

At block 217, the computing device may process the syntactic trees to the produce a semantic structure 218 corresponding to sentence 212. Semantic structure 218 may reflect, in language-independent terms, the semantics conveyed by original sentence. Semantic structure 218 may be represented by an acyclic graph (e.g., a tree may be complemented by one or more non-tree link, such as an edge of the graph among two nodes of the graph). The original words of the source sentence are represented by the nodes corresponding to language-independent semantic classes of semantic hierarchy 510. The edges of the graph represent deep (semantic) relationships between items of the sentence. The transfer to semantic structure 218 may be produced based on analysis rules 460, and may involve associating, one or more attributes (reflecting lexical, syntactic, and/or semantic properties of the words of original sentence 212) with each semantic class.

Figure 11:
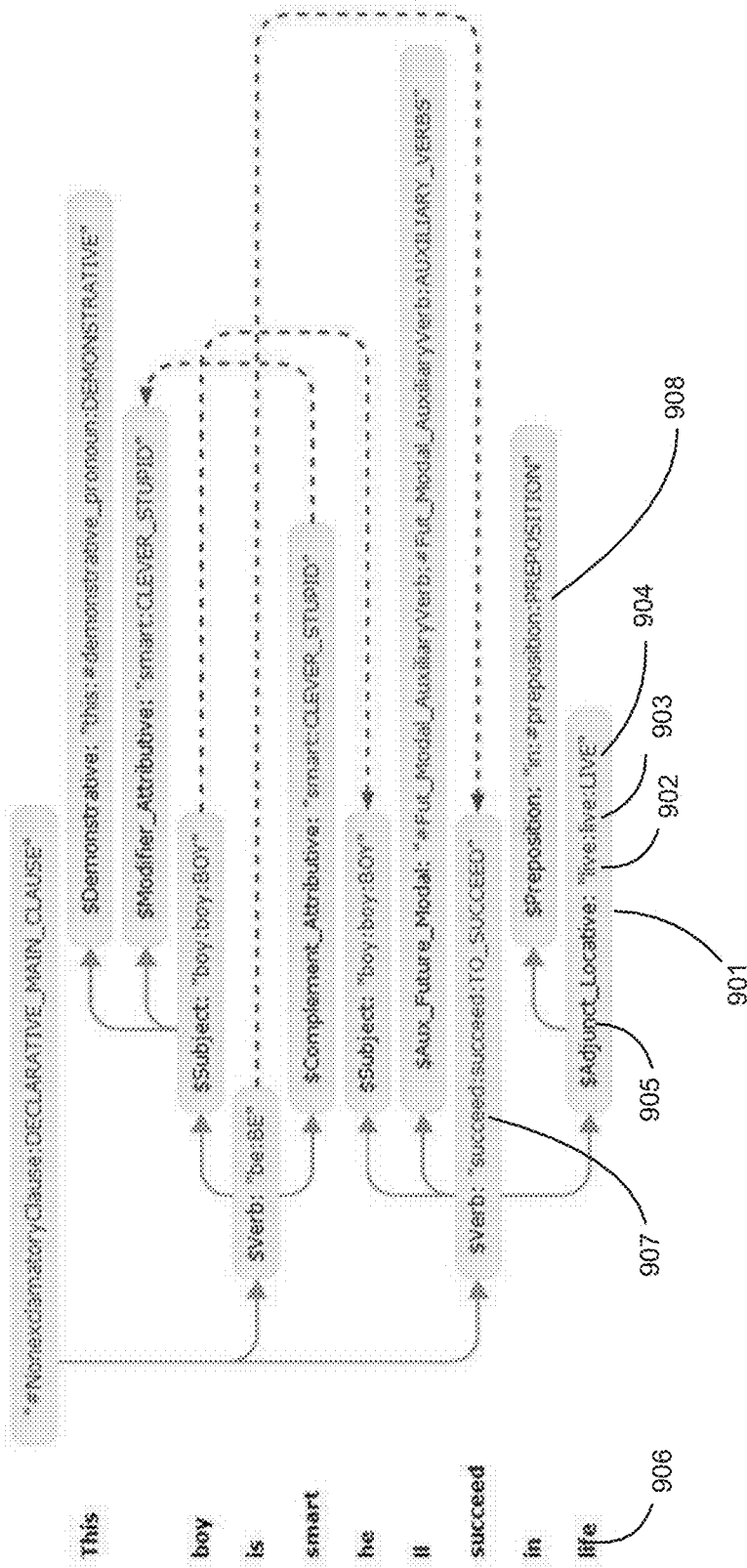
FIG. 11 illustrates an example syntactic structure corresponding to the sentence illustrated by FIG. 10.

FIG. 11 illustrates an example syntactic structure corresponding to the sentence illustrated by FIG. 10. Node 901 corresponds to the lexical element "life" 906 in original sentence 212. By applying the method of syntactico-semantic analysis described herein, the computing device may establish that lexical element "life" 906 represents one of the lexemes of a derivative form "live" 902 associated with a semantic class "LIVE" 904, and fills in a surface slot $Adjunct_Locative (905) of the parent constituent, which is represented by a controlling node $Verb:succeed:succeed:TO_SUCCEED (907).

Figure 12:
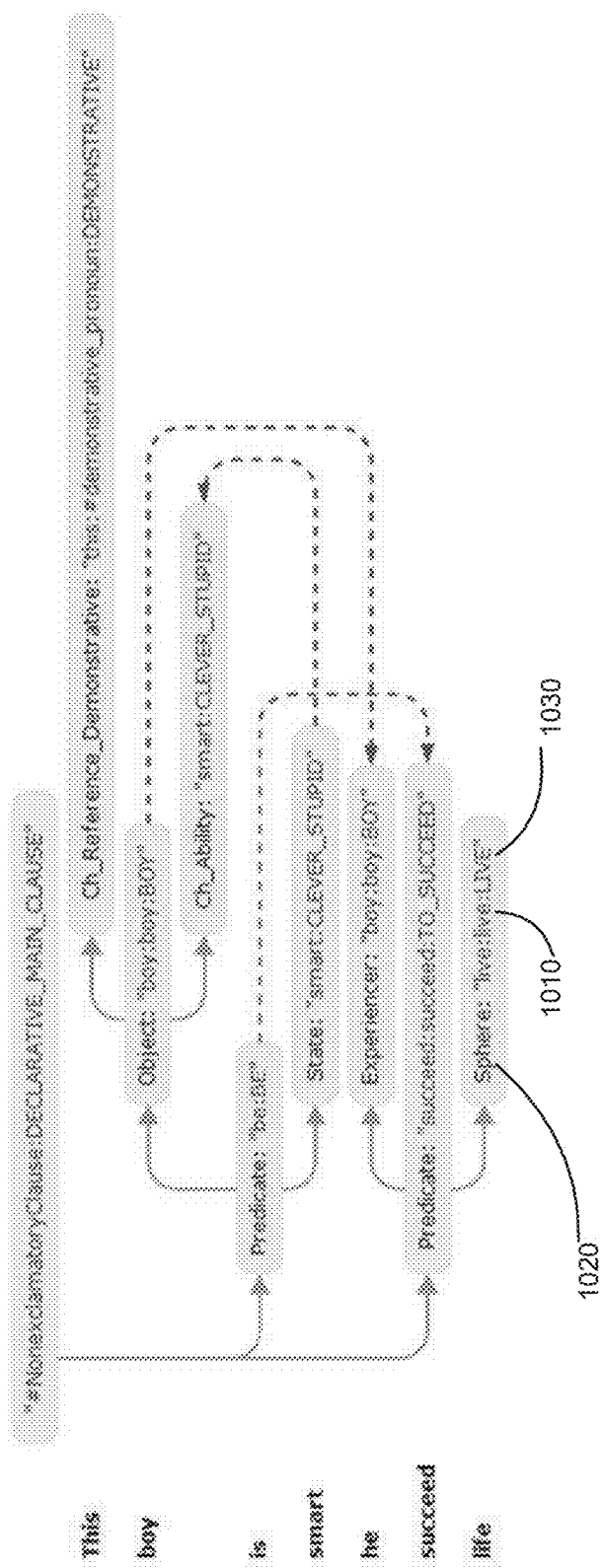
FIG. 12 illustrates a semantic structure corresponding to the syntactic structure of FIG. 11.

FIG. 12 illustrates a semantic structure corresponding to the syntactic structure of FIG. 11. With respect to the above referenced lexical element "life" 906 of FIG. 11, the semantic structure comprises lexical and semantic classes 1010 and 1030 similar to those of FIG. 11, but instead of surface slot 905, the semantic structure comprises a deep slot "Sphere" 1020.

As noted herein above, and ontology may be provided by a model representing objects pertaining to a certain branch of knowledge (subject area) and relationships among such objects. Thus, an ontology is different from the semantic hierarchy, despite the fact that it may be associated with elements of a semantic hierarchy by certain relationships (also referred to as "anchors"). An ontology may comprise definitions of a plurality of classes, such that each class corresponds to a concept of the subject area. Each class definition may comprise definitions of one or more objects associated with the class. Following the generally accepted terminology, an ontology class may also be referred to as concept, and an object belonging to a class may also be referred to as an instance of the concept.

In accordance with one or more aspects of the present disclosure, the computing device implementing the methods described herein may index one or more parameters yielded by the semantico-syntactic analysis. Thus, the methods described herein allow considering not only the plurality of words comprised by the original text corpus, but also pluralities of lexical meanings of those words, by storing and indexing all syntactic and semantic information produced in the course of syntactic and semantic analysis of each sentence of the original text corpus. Such information may further comprise the data produced in the course of intermediate stages of the analysis, the results of lexical selection, including the results produced in the course of resolving the ambiguities caused by homonymy and/or coinciding grammatical forms corresponding to different lexico-morphological meanings of certain words of the original language.

One or more indexes may be produced for each text, text corpus, or text corpora. An index may be represented by a memory data structure, such as a table, comprising a plurality of entries. Each entry may represent a mapping of a certain element or parameter of descriptions (e.g., one or more words, a lexical meaning, a syntactic relationship, a morphological, lexical, syntactic or semantic property, or a syntactic or semantic structure) to one or more identifiers (or addresses) of occurrences of the semantic structure element within the original text.

In certain implementations, an index may comprise one or more values of morphological, syntactic, lexical, and/or semantic parameters. These values may be produced in the course of the two-stage semantic analysis, as described in more details herein. The index may be employed in various natural language processing tasks, including the task of performing semantic search.

The computing device implementing the method may extract a wide spectrum of lexical, grammatical, syntactic, pragmatic, and/or semantic characteristics in the course of performing the syntactico-semantic analysis and producing semantic structures. In an illustrative example, the system may extract and store certain lexical information, associations of certain lexical units with semantic classes, information regarding grammatical forms and linear order, information regarding syntactic relationships and surface slots, information regarding the usage of certain forms, aspects, tonality (e.g., positive and negative), deep slots, non-tree links, semantemes, etc.

The computing device implementing the methods described herein may produce, by performing one or more text analysis methods described herein, and index any one or more parameters of the language descriptions, including lexical meanings, semantic classes, grammemes, semantemes, etc. Semantic class indexing may be employed in various natural language processing tasks, including semantic search, classification, clustering, text filtering, etc. Indexing lexical meanings (rather than indexing words) allows searching not only words and forms of words, but also lexical meanings, i.e., words having certain lexical meanings. The computing device implementing the methods described herein may also store, index and search the syntactic and semantic structures produced by one or more text analysis methods described herein, for employing those structures and/or indexes in semantic search, classification, clustering, and document filtering.

In various implementations, the computing device implementing the methods described herein may employ indexes comprising one or more integers for indexing various syntactic, semantic, and other parameters. In an illustrative example, for surface or deep slots may be indexed using two-integer combinations, in which the integers identify occurrences of the pairs of words corresponding to a certain slot. For example, for the example semantic structure of FIG. 12, deep slot "Sphere" 1010 associates the lexical meaning "succeed:TO_SUCCEED" 1020 with the lexical meaning "life:LIVE" 1030. More specifically, lexical meaning "life:LIVE" fills the deep slot "Sphere" of the verb "succeed:TO_SUCCEED." In the course of building an index of lexical meanings, the computing device may associate these lexical values with identifiers of their respective positions in the original text, e.g., N1 and N2, among others.

Similar methods may be employed for indexing not only words, but also their lexical meanings, semantic classes, syntactic and semantic relationships, and/or other elements of syntactic and semantic structures employed and/or produced by the methods described herein. The indexes may facilitate searching and identifying certain contexts not only by keywords, but also contexts specified by certain lexical meanings, meanings associated with certain semantic classes, syntactic and/or semantic properties, morphological properties, or combinations thereof.

The computing device implementing the methods described herein may also perform search of certain fragments of syntactic or semantic structures. Such searches may yield sentences, paragraphs, or other textual fragments, as specified by the search parameters.

The computing device implementing the methods described herein may analyze a plurality of sentences comprised by the original text corpus, and may store the results of the syntactic and semantic analysis of those sentences. Hence, the computing device may be programmed to compare the syntactic and semantic structures, as well as perform their classification, clustering, and/or other processing, including producing their respective visual representations using a graphical user interface (GUI) device.

Referring again to FIG. 1, at block 140 the computing device implementing the method identifies two similar semantic structures, in order to identify semantically similar or equivalent words or word combinations. In an illustrative example, the computing device may identify a first semantic structure and a second semantic structure, such that the first identified semantic structure comprises a first substructure, which is similar, in view of a certain similarity criterion, to a second substructure comprised by the second identified semantic structure. The similarity criterion may represent at least partial equivalence of the two substructures, as described in more details herein below. In an illustrative example, each of the identified similar substructures may comprise two parts (referred to as "left context" and "right context" to indicate that they are surrounding the respective remaining substructures of the first semantic structure and the second semantic structure).

In various implementations, the computing device implementing the method may employ various indexes to identify similar semantic structures. In an illustrative example, the computing device may employ indexes of lexical values, indexes of surface slots, and/or indexes of deep slots. In another illustrative example, the computing device may employ N-gram indexes, i.e., indexes of N element sequences, the elements of which may be represented by lexical meanings, surface slots, etc.

In an illustrative example, the original text corpus may comprise a plurality of legal documents. Such documents usually comprise a relatively large share of sentences having similar semantic structure. An illustrative example is described herein involving creating an ontology concept and/or adding concept instances related to various modifications of the term "employment termination" in various contexts, including "employer initiated termination," "voluntary separation," "discharge," "removal from office," as well as semantically similar expressions such as "dismissal," "employment contract termination," etc. The computing device implementing the method may select certain classes of structures, e.g., structures describing a noun group, structure describing a fact (including a subject, a predicate, and an object), structures comprising a certain deep slot or a certain semantic class, etc.

Figure 13:
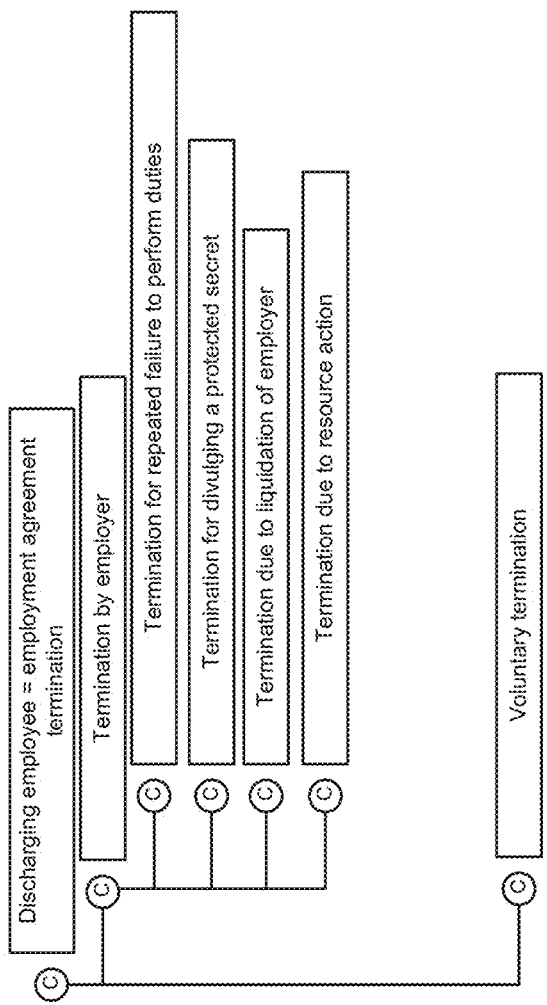
FIG. 13 schematically illustrates an ontology class, in accordance with one or more aspects of the present disclosure.

The term "employment termination" may be represented by a corresponding ontology class, as schematically illustrated by FIG. 13. The computing device implementing the methods described herein may process the original text corpus and/or its indexes to identify semantically similar or equivalent terms to be added to the ontology class. In various illustrative example, such terms as "terminating an employee," "terminating a person," "terminating employment," "removal from office" may be identified by the computing device as belonging to the example ontology class "Discharging employee=Employment Agreement Termination."

The method of FIG. 1 is based on the assumption that semantically similar or equivalent words or expressions may appear in the text corpus two or more times, and that at least some of such occurrences would involve the semantically similar or equivalent words or expressions appearing in similar or equivalent contexts.

In an illustrative example, the method may process the following two sentences:

(a) In a lawsuit to reinstate employment of a person whose employment agreement has been terminated by the employer, the burden of proof of a legal cause of the discharge rests upon the employer; and (b) In a lawsuit to reinstate employment of a person whose employment agreement has been terminated by the employer, the burden of proof of a legal cause of the employment agreement termination rests upon the employer.

Figure 14:
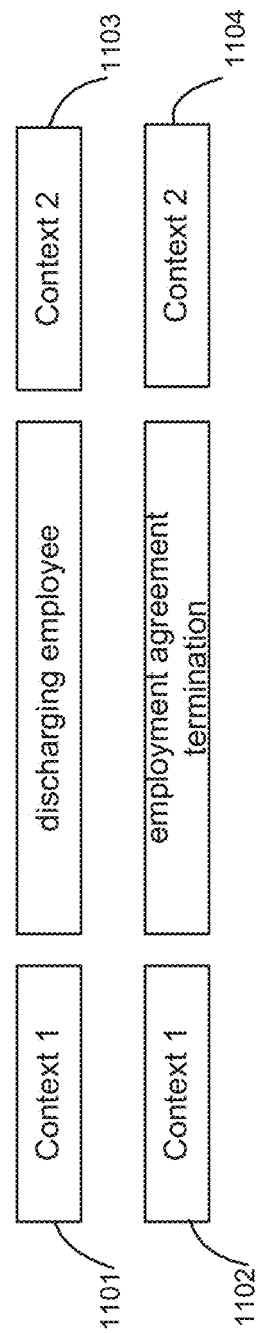
FIG. 14 schematically illustrates a pair of semantic structures identified by a method for creating ontologies by analyzing natural language texts, in accordance with one or more aspects of the present disclosure.
Figure 15:
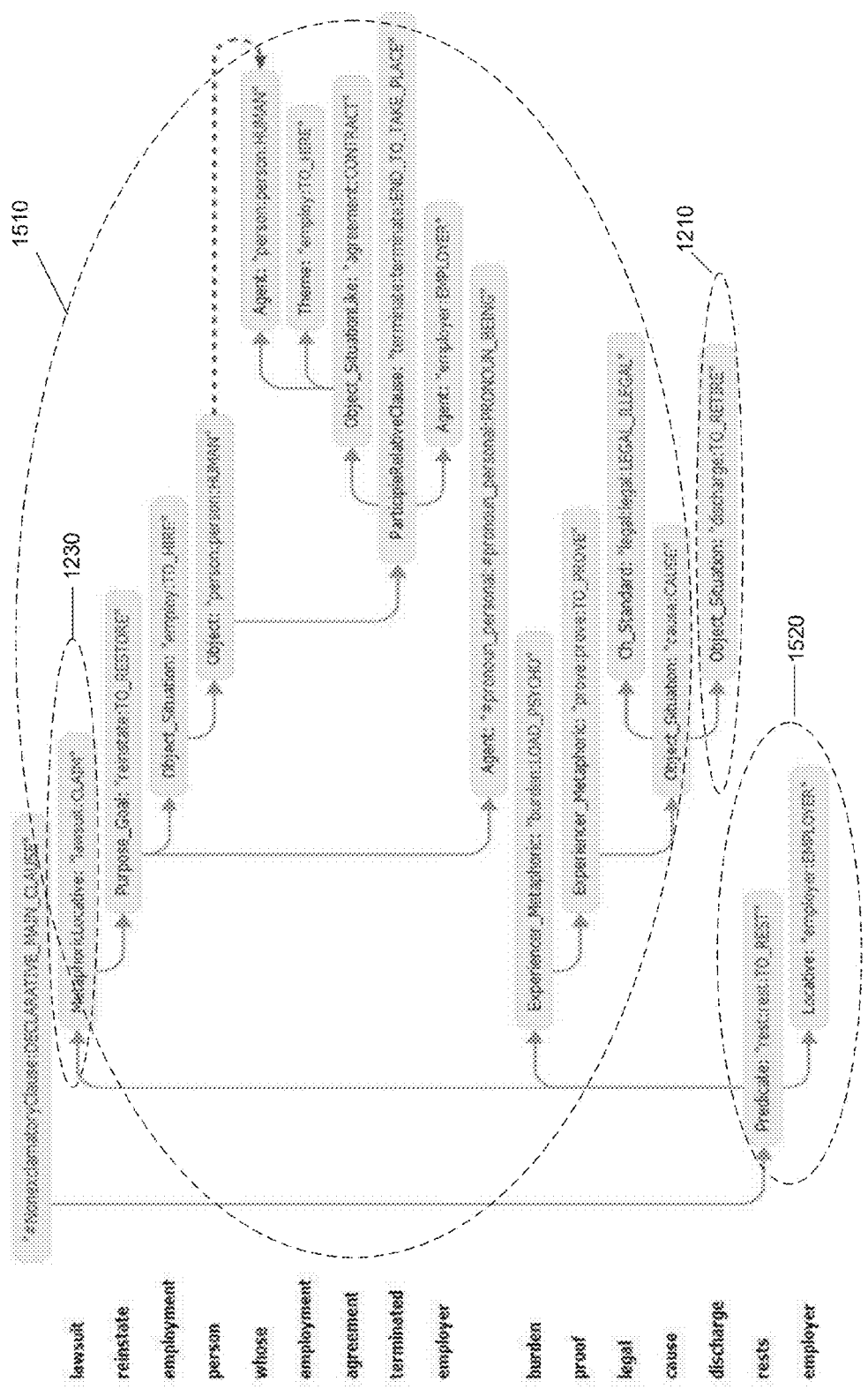
FIGS. 15-17 illustrate example semantic structures corresponding to an example sentence analyzed by a method for creating ontologies by analyzing natural language texts, in accordance with one or more aspects of the present disclosure.
Figure 16:
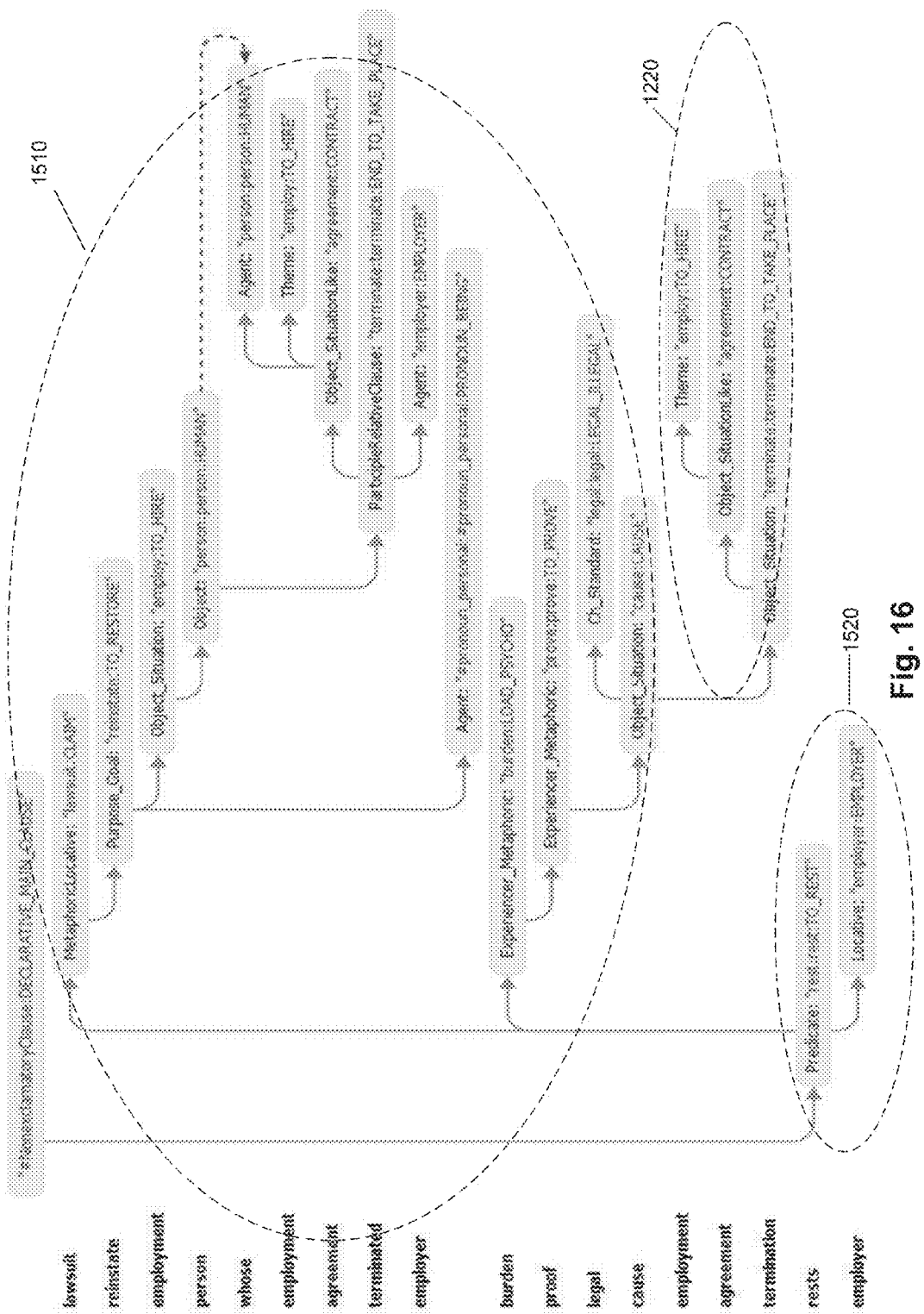

As schematically illustrated by FIG. 14, these two sentences comprise equivalent left contexts "in a lawsuit to reinstate employment of a person whose employment agreement has been terminated by the employer, the burden of proof of a legal cause of," 1101 and 1102, as well as equivalent right contexts "rests upon the employer," 1103 and 1104, respectively. The context equivalency may be established by the textual comparison or, if the contexts are semantically similar but textually different, by comparison of their respective semantic structures. Semantic structures 1510 and 1520 corresponding to sentences (a) and (b) are schematically illustrated by FIGS. 15 and 16.

To minimize the number of iterations, the plurality of semantico-syntactic structures representing the original text corpus may be preliminary classified, clustered, and/or filtered (e.g., based on certain semantic classes). To further minimize the number of iterations, the semantico-syntactic structures comprised by the resulting subsets (e.g., classes or clusters) may be compared pairwise. In certain implementations, the computing device may be configured to identify two or more structures that have equivalent substructures comprising left and right contexts, such as the above referenced sentences (a) and (b). Such substructures may not be textually equivalent, but may have equivalent semantic structures. Two semantic structures may be considered equivalent, for example, if they comprise equivalent sets of semantic classes represented by their respective nodes, and further comprise equivalent sememes associated with those nodes and equivalent deep slots associated with those nodes. Set of equivalent sememes may be preliminary limited by a certain set, e.g., a set of differentiating sememes. Thus, the deep analysis technology allows comparing semantic meanings of sentences or parts of sentences irrespectively of their syntactic representation.

The computing device implementing the method may then assert a hypothesis that the remaining, after excluding the identified equivalent substructures (e.g., respective left and right contexts), parts of the sentences are semantically similar or equivalent. In the illustrative example of FIGS. 15-16, the computing device may assert a hypothesis that terms "discharge" and "employment agreement termination" are semantically similar or equivalent, even if their respective semantic substructures 1210 and 1220 are different.

The computing device implementing the method may then test the asserted hypothesis, e.g., using the same or similar text corpus after excluding the two sentences being analyzed. In certain implementations, the hypothesis may be tested by identifying, within the same or similar text corpus, other sentences comprising the terms the semantic similarity or equivalency of which is being tested (e.g., "discharge" and "employment agreement termination"). In an illustrative example, the computing device implementing the method may identify two similar or equivalent semantic structures that are different from the two previously identified semantic structures, and include substructures representing the terms the semantic similarity or equivalency of which is being tested, while the remaining parts of the newly identified structures are semantically similar or equivalent (e.g., in view of the same similarity criterion that was employed for establishing the similarity of the first two semantic structures).

In certain implementations, the requirement of the equivalency of the left and right contexts surrounding a candidate substructure may be relaxed, such that the left and right contexts may be required to be similar in view of a certain similarity criterion, wherein the similarity metric value should exceed a certain threshold value.

In an illustrative example, the method may process the following two sentences:

(a) In a lawsuit to reinstate employment of a person whose employment agreement has been terminated by the employer, the burden of proof of a legal cause of the discharge rests upon the employer; and (c) In legal proceedings to reinstate employment of a person whose employment agreement has been terminated by the employer, the burden of proof of a legal cause of the employment agreement termination rests upon the employer.

Figure 17:
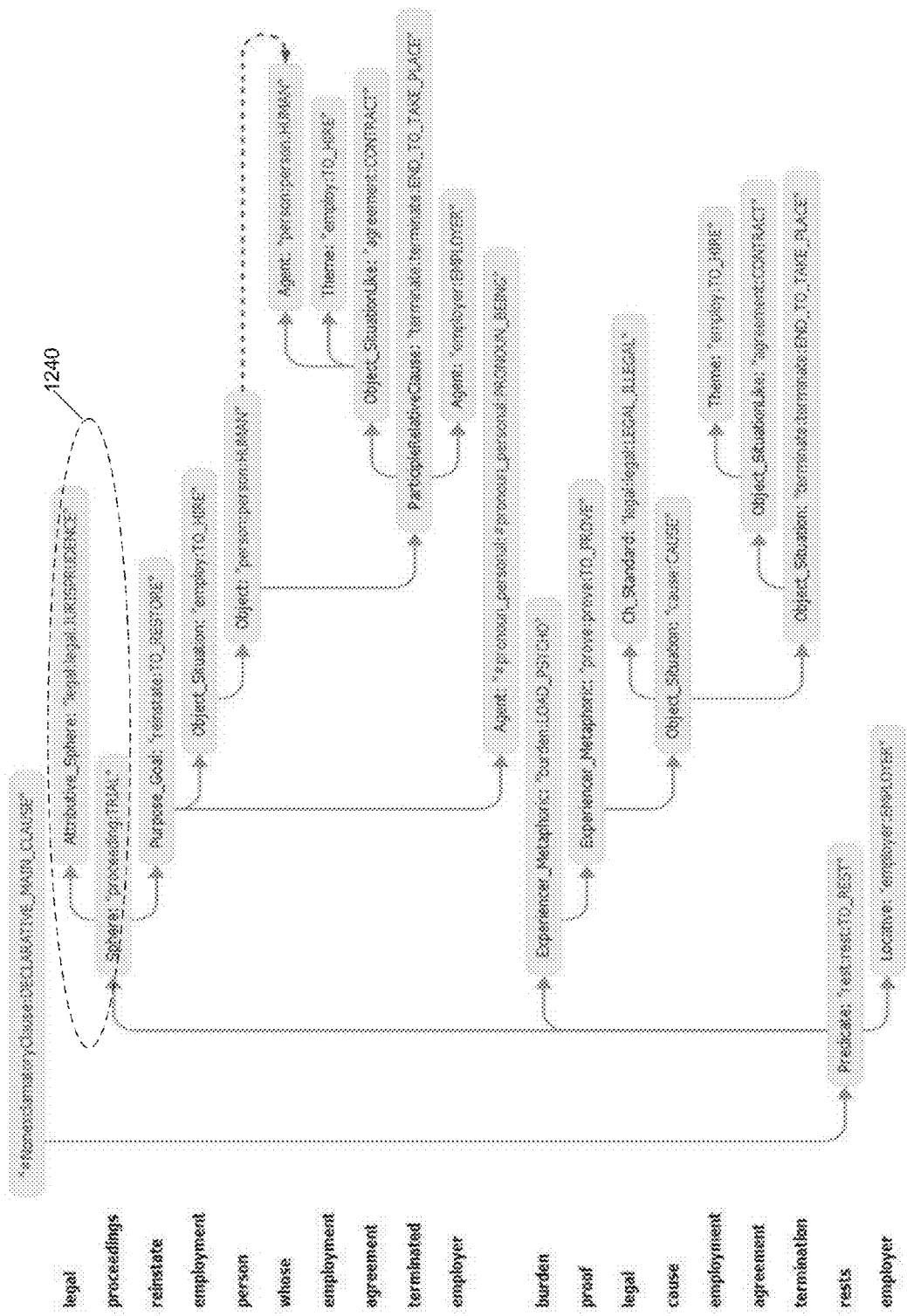

The semantic structures corresponding to sentences (a) and (c) are schematically illustrated by FIGS. 15 and 17, respectively. Semantic structures 1230 and 1240 corresponding to the highlighted parts of sentences, namely "in a lawsuit" and "in legal proceedings," may be considered as substantially similar in view of a certain similarity criterion, and thus having equivalent semantic meanings.

The similarity of semantic structures may be evaluated using an integral similarity metric. Depending upon the requirements to the accuracy and/or computational complexity involved, the metric may take into account various factors including: structural similarity of the semantic structures; presence of the same deep slots or slots associated with the same semantic class; presence of the same lexical or semantic classes associated with the nodes of the semantic structures, presence of parent-child relationship in certain nodes of the semantic structures, such that the parent and the child are divided by no more than a certain number of semantic hierarchy levels; presence of a common ancestor for certain semantic classes and the distance between the nodes representing those classes. If certain semantic classes are found equivalent or substantially similar, the metric may further take into account the presence or absence of certain differentiating semantemes and/or other factors.

In certain implementations, a partial order relationship of semantic structures may be defined. In an illustrative example, sentences and their respective semantic structures may be ordered by the degree of abstractness, e.g., starting from less abstract (more specific) and moving to more abstract (less specific) statements. In certain implementations, each semantic structure may be associated with a certain score reflecting the partial order relationship.

Referring again to FIG. 1, at block 150, the computing device implementing the method may ascertain that the respective interior contexts of the first semantic structure and second semantic structure (wherein each interior context is surrounded by the respective left and right contexts) are similar in view of a certain similarity criterion.

At block 160, the computing device may designate the words or word combinations corresponding to the interior contexts of the two semantic structures as being semantically similar or equivalent.

At block 170, the computing device may define the objects represented by the respective interior contexts of the two semantic structures (i.e., the third substructure and the fourth substructure) as instances of a certain concept of an ontology associated with the text corpus or field.

In other implementations of the method of FIG. 1, the processing device may identify words and groups of words, which are related as "abstract-specific," and hence may belong to an ontology class and its subclass, or to an ontology class as its instances.

An important advantage of the method of FIG. 1 stems from the fact that the instances being added to the ontology are produced by a syntactico-semantic analysis of the corresponding semantic structures, which also produced the properties of the objects corresponding to the newly added ontology instances. Hence, those instance properties may be stored in association with the ontology instances and may be later employed for various language-processing tasks.

Another important advantage of the method of FIG. 1 stems from the fact that the newly added ontology instances may be associated with the corresponding elements of the semantic hierarchy, thus allowing to use the associated syntactic and semantic information in various language processing and search tasks.

Figure 18:
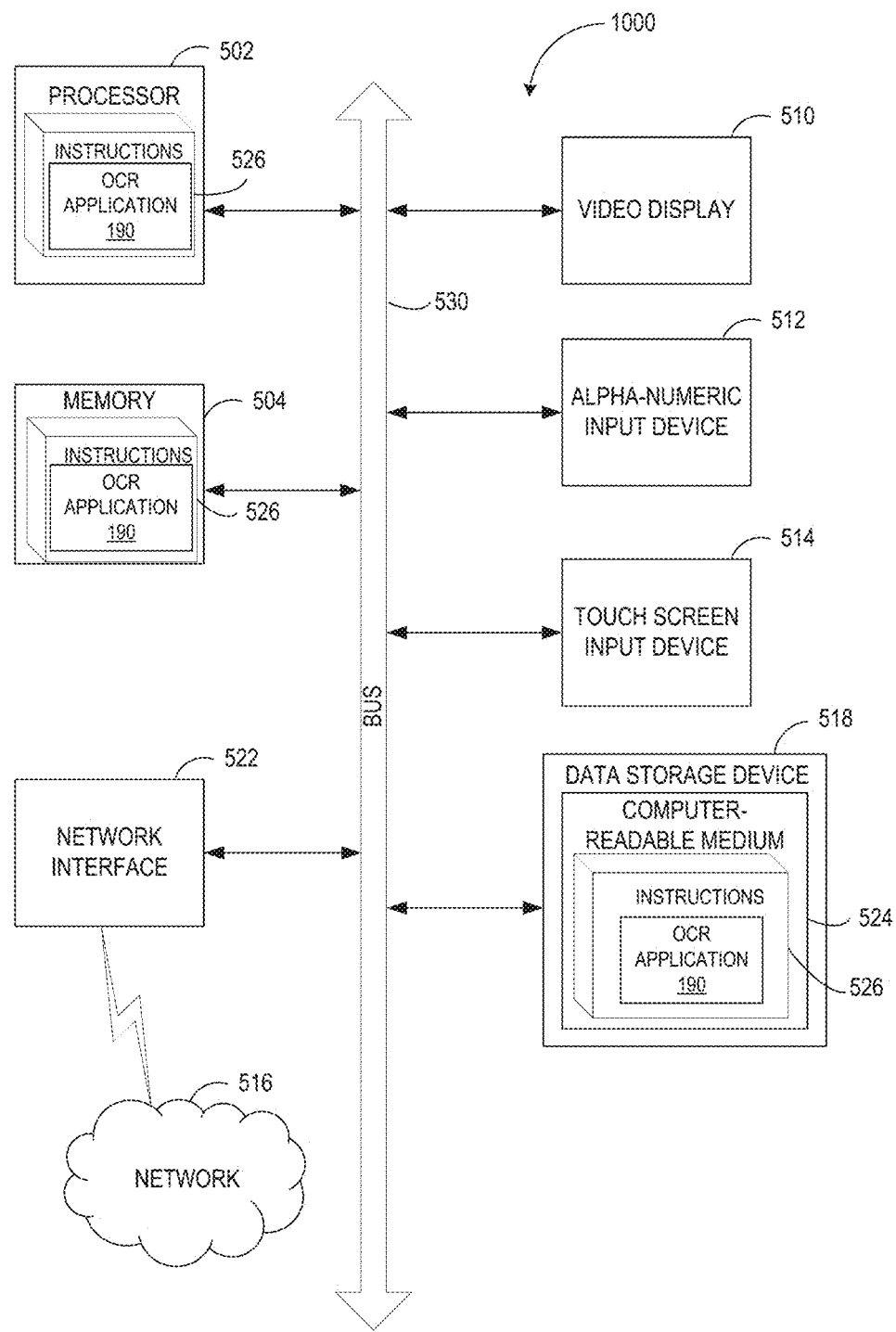
FIG. 18 depicts a diagram of an example computing device implementing the methods described herein.

FIG. 18 illustrates a diagram of an example computing device 1000 which may execute a set of instructions for causing the computing device to perform any one or more of the methods discussed herein. The computing device may be connected to other computing device in a LAN, an intranet, an extranet, or the Internet. The computing device may operate in the capacity of a server or a client computing device in client-server network environment, or as a peer computing device in a peer-to-peer (or distributed) network environment. The computing device may be a provided by a personal computer (PC), a tablet PC, a set-top box (STB), a Personal Digital Assistant (PDA), a cellular telephone, or any computing device capable of executing a set of instructions (sequential or otherwise) that specify operations to be performed by that computing device. Further, while only a single computing device is illustrated, the term "computing device" shall also be taken to include any collection of computing devices that individually or jointly execute a set (or multiple sets) of instructions to perform any one or more of the methodologies discussed herein.

Exemplary computing device 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose computing devices such as a microprocessor, central processing unit, or the like. More particularly, processor 502 may be a complex instruction set computing (CISC) microprocessor, reduced instruction set computing (RISC) microprocessor, very long instruction word (VLIW)

microprocessor, or a processor implementing other instruction sets or processors implementing a combination of instruction sets. Processor 502 may also be one or more special-purpose computing devices such as an application specific integrated circuit (ASIC), a field programmable gate array (FPGA), a digital signal processor (DSP), network processor, or the like. Processor 502 is configured to execute instructions 526 for performing the operations and functions discussed herein.

Computing device 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computing device 1000, main memory 504 and processor 502 also constituting computer-readable storage media. Instructions 526 may further be transmitted or received over network 516 via network interface device 522.

In certain implementations, instructions 526 may include instructions of method 800 for creating ontologies by analyzing natural language texts. While computer-readable storage medium 524 is shown in the example of FIG. 4 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying" or the like, refer to the actions and processes of a computing device, or similar electronic computing device, that manipulates and transforms data represented as physical (e.g., electronic) quantities within the computing device's registers and memories into other data similarly represented as physical quantities within the computing device memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving a plurality of semantic structures associated with a text corpus;
   identifying, by a processing device, a first semantic structure and a second semantic structure, wherein the first semantic structure comprises a first substructure and a second substructure, wherein the second semantic structure comprises a third substructure and a fourth substructure, and wherein the first substructure is similar to the third substructure in view of a first similarity criterion; and
   responsive to determining that the second substructure is similar to the fourth substructure in view of a second similarity criterion, associating, with a certain concept of an ontology associated with the text corpus, objects represented by the second substructure and the fourth substructure.

2. The method of claim 1, wherein the ontology comprises one or more concepts, each concept associated with one or more instances of the concept represented by one or more objects.

3. The method of claim 1, wherein the first substructure comprises a left context and a right context surrounding the second substructure.

4. The method of claim 1, wherein the second substructure comprises a left context and a right context surrounding the fourth substructure.

5. The method of claim 1, wherein determining that the second substructure is similar to the fourth substructure comprises: identifying a third semantic structure and a fourth semantic structure, wherein the third semantic structure comprises the second substructure and a fifth substructure, wherein the fourth semantic structure comprises the fourth substructure and a sixth substructure, and wherein the firth substructure is similar to the sixth substructure in view of the first similarity criterion.

6. The method of claim 1, wherein at least one of the first semantic structure and the second semantic structure is represented by a graph comprising a plurality of nodes corresponding to a plurality of semantic classes and a plurality of edges corresponding to a plurality of semantic relationships.

7. The method of claim 1, wherein identifying the first semantic structure and the second semantic structure comprises comparing a first plurality of semantic classes associated with a first plurality of nodes of a first graph representing the first semantic structure to a second plurality of semantic classes associated with a second plurality of nodes of a second graph representing the second semantic structure.

8. The method of claim 1, wherein identifying the first semantic structure and the second semantic structure comprises comparing a first plurality of semantemes associated with a first plurality of nodes of a first graph representing the first semantic structure to a second plurality of semantemes associated with a second plurality of nodes of a second graph representing the second semantic structure.

9. The method of claim 1, wherein identifying the first semantic structure and the second semantic structure comprises comparing a first plurality of deep slots associated with a first plurality of nodes of a first graph representing the first semantic structure to a second plurality of deep slots associated with a second plurality of nodes of a second graph representing the second semantic structure.

10. The method of claim 1, further comprising producing the plurality of semantic structures by performing a syntactico-semantic analysis of the text corpus.

11. A system, comprising:
a memory;
a processor, coupled to the memory, the processor configured to:
receiving a plurality of semantic structures associated with a text corpus;
identify a first semantic structure and a second semantic structure, wherein the first semantic structure comprises a first substructure and a second substructure, wherein the second semantic structure comprises a third substructure and a fourth substructure, and wherein the first substructure is similar to the third substructure in view of a first similarity criterion; and
responsive to determining that the second substructure is similar to the fourth substructure in view of a second similarity criterion, associate, with a certain concept of an ontology associated with the text corpus, objects represented by the second substructure and the fourth substructure.

12. The system of claim 11, wherein determining that the second substructure is similar to the fourth substructure comprises: identifying a third semantic structure and a fourth semantic structure, wherein the third semantic structure comprises the second substructure and a fifth substructure, wherein the fourth semantic structure comprises the fourth substructure and a sixth substructure, and wherein the firth substructure is similar to the sixth substructure in view of the first similarity criterion.

13. The system of claim 11, wherein identifying the first semantic structure and the second semantic structure comprises comparing a first plurality of semantic classes associated with a first plurality of nodes of a first graph representing the first semantic structure to a second plurality of semantic classes associated with a second plurality of nodes of a second graph representing the second semantic structure.

14. The system of claim 11, wherein identifying the first semantic structure and the second semantic structure comprises comparing a first plurality of semantemes associated with a first plurality of nodes of a first graph representing the first semantic structure to a second plurality of semantemes associated with a second plurality of nodes of a second graph representing the second semantic structure.

15. The system of claim 11, wherein identifying the first semantic structure and the second semantic structure comprises comparing a first plurality of deep slots associated with a first plurality of nodes of a first graph representing the first semantic structure to a second plurality of deep slots associated with a second plurality of nodes of a second graph representing the second semantic structure.

16. A computer-readable non-transitory storage medium comprising executable instructions that, when executed by a computing device, cause the computing device to perform operations comprising:
receiving a plurality of semantic structures associated with a text corpus;
identifying, by a processing device, a first semantic structure and a second semantic structure, wherein the first semantic structure comprises a first substructure and a second substructure, wherein the second semantic structure comprises a third substructure and a fourth substructure, and wherein the first substructure is similar to the third substructure in view of a first similarity criterion; and
responsive to determining that the second substructure is similar to the fourth substructure in view of a second similarity criterion, associating, with a certain concept of an ontology associated with the text corpus, objects represented by the second substructure and the fourth substructure.

17. The computer-readable non-transitory storage medium of claim 16, wherein determining that the second substructure is similar to the fourth substructure comprises: identifying a third semantic structure and a fourth semantic structure, wherein the third semantic structure comprises the second substructure and a fifth substructure, wherein the fourth semantic structure comprises the fourth substructure and a sixth substructure, and wherein the firth substructure is similar to the sixth substructure in view of the first similarity criterion.

18. The computer-readable non-transitory storage medium of claim 16, wherein identifying the first semantic structure and the second semantic structure comprises comparing a first plurality of semantic classes associated with a first plurality of nodes of a first graph representing the first semantic structure to a second plurality of semantic classes associated with a second plurality of nodes of a second graph representing the second semantic structure.

19. The computer-readable non-transitory storage medium of claim 16, wherein identifying the first semantic structure and the second semantic structure comprises comparing a first plurality of semantemes associated with a first plurality of nodes of a first graph representing the first semantic structure to a second plurality of semantemes associated with a second plurality of nodes of a second graph representing the second semantic structure.

20. The computer-readable non-transitory storage medium of claim 16, wherein identifying the first semantic structure and the second semantic structure comprises comparing a first plurality of deep slots associated with a first plurality of nodes of a first graph representing the first semantic structure to a second plurality of deep slots associated with a second plurality of nodes of a second graph representing the second semantic structure.

* * * * *